United States Patent
Sasaki et al.

(10) Patent No.: US 8,970,453 B2
(45) Date of Patent: Mar. 3, 2015

(54) DISPLAY APPARATUS, DISPLAY METHOD, AND VEHICLE

(75) Inventors: Takashi Sasaki, Kanagawa-ken (JP); Haruhiko Okumura, Kanagawa-ken (JP); Takahisa Yoneyama, Kanagawa-ken (JP); Yugo Kuwabara, Kanagawa-ken (JP); Yasuhiko Kawawada, Kanagawa-ken (JP); Osamu Nagahara, Tokyo (JP); Noriko Odate, Ibaraki-ken (JP); Shigeo Morimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 215 days.

(21) Appl. No.: 13/490,666

(22) Filed: Jun. 7, 2012

(65) Prior Publication Data

US 2012/0268351 A1 Oct. 25, 2012

Related U.S. Application Data

(63) Continuation of application No. PCT/JP2010/007081, filed on Dec. 6, 2010.

(30) Foreign Application Priority Data

Dec. 8, 2009 (JP) ................................. 2009-278670

(51) Int. Cl.
*G09G 5/00* (2006.01)
*G02B 27/01* (2006.01)
(Continued)

(52) U.S. Cl.
CPC .............. *G02B 27/01* (2013.01); *G01C 21/365* (2013.01); *G02B 2027/0141* (2013.01); *G09G 3/001* (2013.01); *Y02T 10/84* (2013.01)
USPC ............ 345/8; 340/525; 340/461; 455/552.1; 455/550.1; 455/418; 701/209; 701/211; 701/212

(58) Field of Classification Search
CPC ............. G02B 27/017; G02B 27/0172; G02B 2027/0132; G02B 2027/0187; G02B 27/0176

USPC ........ 345/7, 581, 8; 340/525, 461; 455/552.1, 455/550.1, 418; 701/209, 211, 212, 25
See application file for complete search history.

(56) References Cited

U.S. PATENT DOCUMENTS 7,830,697 B2 11/2010 Herner
7,839,574 B2 11/2010 Okada et al.
(Continued)

FOREIGN PATENT DOCUMENTS

EP 2 412 557 A1 2/2012
JP 2007-121001 5/2007
(Continued)

OTHER PUBLICATIONS

International Search Report for International Application No. PCT/JP2010/007081 mailed on Jan. 25, 2011.
(Continued)

*Primary Examiner* — Shaheda Abdin
(74) *Attorney, Agent, or Firm* — Amin, Turocy & Watson, LLP

(57) ABSTRACT

According to one embodiment, a display apparatus includes an image data generation unit configured to generate image data and an image projection unit configured to project a light flux including an image toward a human riding in a vehicle. The image is based on the image data. The image data generation unit is configured to generate the image data relating to the image including a first display object indicating a travel direction of the vehicle at a travel direction change point when a distance between the travel direction change point and the vehicle is a first distance. The image data generation unit is configured to generate the image data relating to the image including a second display object displayed to correspond to a position of the travel direction change point when the distance is a second distance shorter than the first distance.

29 Claims, 18 Drawing Sheets

(51) Int. Cl.
*G01C 21/36* (2006.01)
*G09G 3/00* (2006.01)

(56) References Cited

U.S. PATENT DOCUMENTS

| | | | |
|---|---|---|---|
| 7,952,808 B2 | 5/2011 | Hotta et al. | |
| 8,081,382 B2 | 12/2011 | Okada et al. | |
| 2003/0032483 A1* | 2/2003 | Mifune et al. | 463/42 |
| 2005/0154505 A1* | 7/2005 | Nakamura et al. | 701/1 |
| 2006/0140448 A1* | 6/2006 | Fujii et al. | 382/104 |
| 2009/0135374 A1 | 5/2009 | Horiuchi et al. | |
| 2009/0201225 A1 | 8/2009 | Okada et al. | |
| 2009/0243963 A1* | 10/2009 | Hotta et al. | 345/7 |
| 2010/0066832 A1 | 3/2010 | Nagahara et al. | |
| 2010/0066925 A1 | 3/2010 | Nagahara et al. | |
| 2010/0066984 A1 | 3/2010 | Horiuchi et al. | |
| 2010/0073579 A1 | 3/2010 | Okada et al. | |
| 2010/0073636 A1 | 3/2010 | Sasaki et al. | |
| 2010/0157430 A1 | 6/2010 | Hotta et al. | |
| 2010/0164702 A1 | 7/2010 | Sasaki et al. | |
| 2010/0214635 A1 | 8/2010 | Sasaki et al. | |
| 2011/0001639 A1 | 1/2011 | Sasaki et al. | |
| 2011/0187844 A1 | 8/2011 | Ogawa et al. | |
| 2011/0216096 A1 | 9/2011 | Sasaki et al. | |
| 2011/0228403 A1 | 9/2011 | Masuda et al. | |
| 2011/0298693 A1 | 12/2011 | Tasaki et al. | |
| 2012/0008048 A1 | 1/2012 | Sekine et al. | |
| 2012/0075708 A1 | 3/2012 | Hagiwara et al. | |
| 2012/0169591 A1 | 7/2012 | Moriya et al. | |
| 2012/0170130 A1 | 7/2012 | Sasaki et al. | |

FOREIGN PATENT DOCUMENTS

| | | |
|---|---|---|
| JP | 2007-121031 | 5/2007 |
| JP | 2009-244355 | 10/2009 |
| WO | 2007 1451990 A1 | 12/2007 |
| WO | 2011/016079 A1 | 2/2011 |
| WO | 2011/033766 A1 | 3/2011 |
| WO | 2011/070738 A1 | 6/2011 |
| WO | 2011/108091 A1 | 9/2011 |
| WO | 2011-125135 A1 | 10/2011 |

OTHER PUBLICATIONS

Japanese Office Action for Japanese Application No. 2009-278670 mailed on Feb. 7, 2013.

* cited by examiner

DISPLAY APPARATUS, DISPLAY METHOD, AND VEHICLE

CROSS-REFERENCE TO RELATED APPLICATIONS

This is a continuation application of International Application PCT/JP2010/007081, filed on Dec. 6, 2010. This application also claims priority to Japanese Application No. 2009-278670, filed on Dec. 8, 2009. The entire contents of each are incorporated herein by reference.

FIELD

Embodiments described herein relate generally to a display apparatus, a display method, and a vehicle.

BACKGROUND

In an automotive head-up display (HUD), external environment information and display information are visually confirmed simultaneously by projecting display information such as navigation information, etc., onto the windshield.

In particular, a display can be provided to perceive an image at a depthward position matched to the background and increase a sense of depth and/or three-dimensionality by viewing the display with one eye. For example, JP-A 2009-244355 (Kokai) discusses the use in such a case of multiple images in which the sizes of shapes that are displayed are sequentially changed in a direction away from the position of the human.

On the other hand, the operation of the car is not performed instantaneously; and decisions are made by the driver until when the driver performs the driving operations. Easier use and safer operations can be realized by effectively making the decisions.

For example, an arrow or the like that provides a prompt to change the travel direction of the car is one image presented to the human in a HUD. In the case where this arrow or the like is presented to the human, i.e., the driver of the car, special display information is necessary for the human to effectively perform the decision operation.

DETAILED DESCRIPTION

Figure 1A:
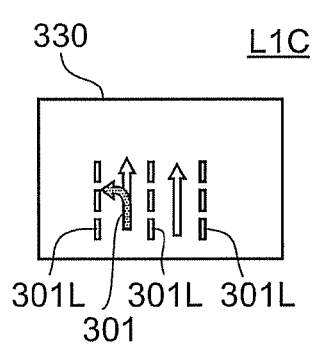
FIGS. 1A to 1D are schematic views illustrating the operation of a display apparatus according to a first embodiment.

According to one embodiment, a display apparatus includes an image data generation unit and an image projection unit. The image data generation unit is configured to generate image data. The image projection unit is configured to project a light flux including an image toward a human riding in a vehicle by using a windshield unit of the vehicle to reflect the light flux. The image is based on the image data generated by the image data generation unit. The image data generation unit is configured to generate the image data relating to the image including a first display object configured to indicate a travel direction of the vehicle at a travel direction change point when a distance between the travel direction change point and the vehicle is a first distance. The travel direction change point is where the travel direction of the vehicle is predicted to be changed based on a travel route determined in relation to the vehicle. The image data generation unit is configured to generate the image data relating to the image including a second display object displayed at a position corresponding to the travel direction change point when the distance between the travel direction change point and the vehicle is a second distance shorter than the first distance. The second display object is configured to indicate the travel direction of the vehicle at the travel direction change point. The second display object has a configuration different from a configuration of the first display object.

According to another embodiment, a display method including projecting a light flux including an image toward a human riding in a vehicle by using a windshield unit of the vehicle to reflect the light flux is disclosed. The method includes displaying a first display object configured to indicate a travel direction of the vehicle at a travel direction change point when a distance between the travel direction change point and the vehicle is a first distance. The travel direction change point is where the travel direction of the vehicle is predicted to be changed based on a travel route determined in relation to the vehicle. The method further includes displaying a second display object at a position corresponding to the travel direction change point when the distance between the travel direction change point and the vehicle is a second distance shorter than the first distance. The second display object is configured to indicate the travel direction of the vehicle at the travel direction change point. The second display object has a configuration different from a configuration of the first display object.

According to another embodiment, a vehicle includes a display apparatus and a windshield unit. The display apparatus includes an image data generation unit and an image projection unit. The image data generation unit is configured to generate image data. The image projection unit is configured to project a light flux including an image toward a human riding in a vehicle by using a windshield unit of the vehicle to reflect the light flux. The image is based on the image data generated by the image data generation unit. The image data generation unit is configured to generate the image data relating to the image including a first display object configured to indicate a travel direction of the vehicle at a travel direction change point when a distance between the travel direction change point and the vehicle is a first distance. The travel direction change point is where the travel direction of the vehicle is predicted to be changed based on a travel route determined in relation to the vehicle. The image data generation unit is configured to generate the image data relating to the image including a second display object displayed at a position corresponding to the travel direction change point when the distance between the travel direction change point and the vehicle is a second distance shorter than the first distance. The second display object is configured to indicate the travel direction of the vehicle at the travel direction change point. The second display object has a configuration different from a configuration of the first display object. The windshield unit is configured to reflect the light flux emitted from the display apparatus toward the human.

Various embodiments will be described hereinafter with reference to the accompanying drawings. According to the embodiment, a HUD-type display apparatus, a display method, and a vehicle are provided for easier decisions by a human viewer operating the vehicle.

In the specification and the drawings of the application, components similar to those described in regard to a drawing thereinabove are marked with like reference numerals, and a detailed description is omitted as appropriate.

First Embodiment

A display apparatus according to a first embodiment can be applied not only to an automotive HUD but also to a simulator such as a driving simulator or a flight simulator and amusement applications such as games; and a display can be provided for easier decisions by a human (human viewer) operating a vehicle. As an example hereinbelow, the case is described where the display apparatus according to the embodiment is applied as a HUD, i.e., an automotive display apparatus.

FIG. 1A to FIG. 1D are schematic views illustrating operations of the display apparatus according to the first embodiment.

Figure 2:
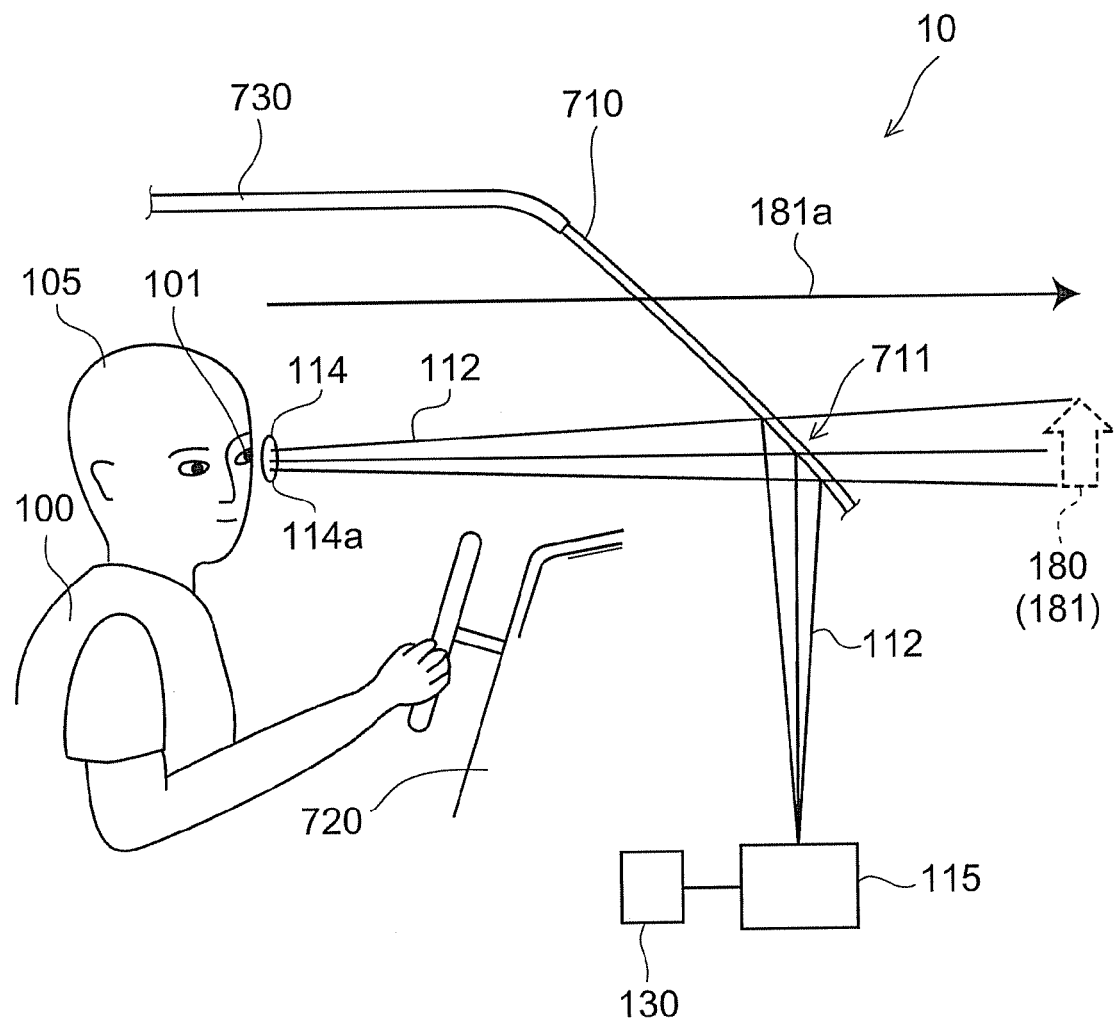
FIG. 2 is a schematic view illustrating the configuration of the display apparatus according to the first embodiment.

FIG. 2 is a schematic view illustrating the configuration of the display apparatus according to the first embodiment.

First, an overview of the configuration of the display apparatus 10 according to the embodiment will be described using FIG. 2.

As shown in FIG. 2, the display apparatus 10 according to the embodiment is mounted in a car 730 (a vehicle). The display apparatus 10 includes an image data generation unit 130 and an image projection unit 115.

The image data generation unit 130 generates image data.

The image projection unit 115 projects light flux 112 including an image based on the image data generated by the image data generation unit 130 toward a human 100 (human viewer) riding in the car 730 by using a windshield unit 710 of the car 730 to reflect the light flux 112.

The windshield unit 710 includes the windshield of the car 730. The windshield unit 710 may further include, for example, a reflecting unit 711 (e.g., a combiner) provided in the windshield of the car 730. In such a case, the light flux 112 is reflected toward the human 100 by being reflected by the reflecting unit 711 provided in the windshield of the car 730. The reflecting unit 711 may be provided apart from the windshield further on the interior side of the car 730 from the windshield. In the case where the reflecting unit 711 is provided apart from the windshield as well, the reflecting unit 711 may be considered to be a portion of the windshield unit 710.

The image included in the light flux 112 includes display content 180. The display content 180 is included in the image that the display apparatus 10 presents to the human 100 and includes, for example, various content relating to the operation information of the car 730 in which the display apparatus 10 is mounted such as an "arrow" indicating the travel direction, the speed, etc. The display content 180 is described below.

As illustrated in FIG. 2, the image projection unit 115 of the display apparatus 10 may be provided, for example, inside the car 730, that is, in the inner portion of a dashboard 720 of the car 730 as viewed from the human 100, i.e., the operator.

It is not always necessary to provide the image data generation unit 130 integrally with the image projection unit 115. For example, the image data generation unit 130 may be mounted not in the interior of the dashboard 720 but at any location of the car 730. The image data from the image data generation unit 130 may be supplied to the image projection unit 115 using a wired or wireless method such as an electrical signal, an optical signal, etc.

The light flux 112 emitted from the image projection unit 115 is reflected by the windshield unit 710 and is incident on the head 105 of the human 100.

At this time, the divergence angle of the light flux 112 is controlled; and the light flux 112 can be designed to be incident on an eye 101 of the human 100. Thereby, the human 100 can view the image included in the light flux 112 with the one eye 101. Thereby, the difficulty of viewing due to binocular parallax that occurs when an image 181 of the display content 180 reflected at the windshield unit 710 is viewed with both eyes is eliminated.

The windshield unit 710 is disposed at a position not less than 21.7 cm from the human 100. Thereby, the sense of depth perceived by the human 100 is increased; and it can be easy for the display content 180 to be perceived at the desired depthward position.

However, the embodiment is not limited thereto. In some cases, the light flux 112 emitted from the image projection unit 115 may be incident on both eyes of the human 100.

After the light flux 112 is emitted from the display apparatus 10, the light flux 112 is reflected by the windshield unit 710 of the car 730 and reaches the eye 101 of the human 100. The human 100 perceives the image 181 (the virtual image) of the display content 180 formed at the position of an image formation position 181a via the windshield unit 710. Thus, the display apparatus 10 can be used as a HUD.

The display content 180 will now be described.

The image that is the display content 180 includes a display object indicating the travel direction of the car 730 at a travel direction change point where the travel direction of the car 730 is predicted to be changed based on a travel route determined in relation to the car 730. The image that is the display content 180 may further include any content, e.g., the speed of the car 730, amounts of fuel and the like, the predicted arrival time at the destination, the travel time, the current time, various warnings, the operation conditions of the car 730 (e.g., whether or not the operation conditions provide good fuel efficiency), the communication state between the car 730 and the outside, etc.

The travel route that is determined in relation to the car 730 recited above is determined by, for example, a navigation system, etc. As described below, the display apparatus 10 may further include a navigation system (a route generation unit) to determine the travel route. Also, the display object of the display apparatus 10 that indicates the travel direction of the car 730 at the travel direction change point may be determined using a travel route determined by a navigation system provided separately from the display apparatus 10.

The display object indicating the travel direction of the car 730 at the travel direction change point may include an image pattern having any configuration such as a shape such as an "arrow" and the like, characters, etc.

In the display apparatus 10 according to the embodiment, the display object is caused to change between the case where the travel direction change point is distal and the case where the travel direction change point is proximal as viewed from the car 730.

Figure 1B:
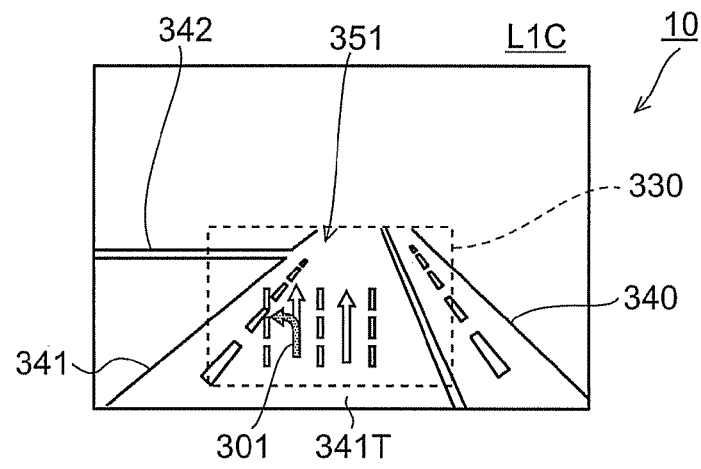
Figure 1C:
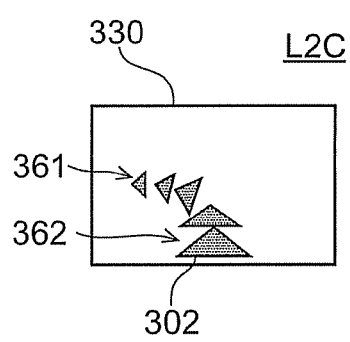
Figure 1D:
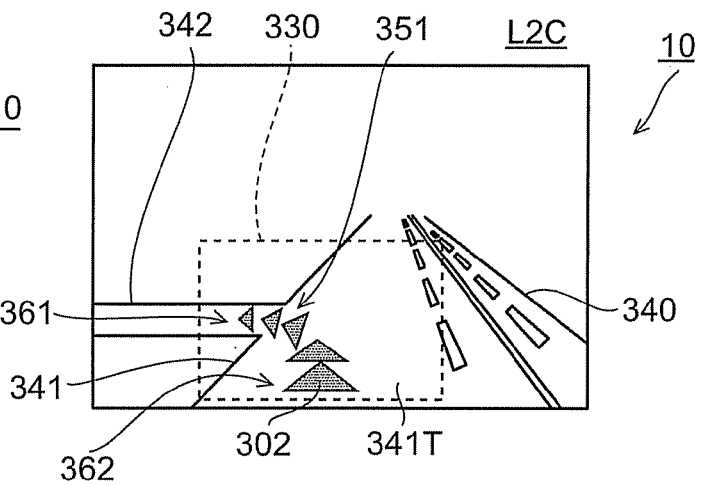

FIG. 1A to FIG. 1D illustrate display states of the display apparatus 10. FIG. 1A and FIG. 1B correspond to the case where the travel direction change point is distal as viewed from the car 730 (a case L1C where the distance between the travel direction change point and the car 730 is long); and FIG. 1C and FIG. 1D correspond to the case where the travel direction change point is proximal as viewed from the car 730 (a case L2C where the distance between the travel direction change point and the car 730 is short). FIG. 1A and FIG. 1C illustrate an image 330 that the human 100 views; and FIG. 1B and FIG. 1D schematically show the image that the human 100 views when the image 330 and an image 340 frontward of the car 730 which is the background of the image 330 are viewed simultaneously.

As shown in FIG. 1A and FIG. 1B, when the distance between a travel direction change point 351 and the car 730 is a first distance, a first display object 301 that indicates the travel direction of the car 730 at the travel direction change point 351 is displayed. The first distance, which is the case L1C where the distance between the travel direction change point 351 and the car 730 is long, is, for example, longer than 40 m.

As shown in FIG. 1B, for example, a road 341 on which the car 730 is travelling is frontward of the human 100. There is an intersection in the road 341; and a branch road 342 is connected at this intersection to the road 341 on which the car 730 is travelling. The human 100 views the image of the road 341 and the image of the intersection where the road 341 intersects the branch road 342 as the frontward image 340.

It is predicted that the travel direction of the car 730 will be changed at this intersection based on the determined travel route. This intersection is the travel direction change point 351.

Thus, the first display object 301 is displayed when the travel direction change point 351, i.e., the intersection, is distal as viewed from the car 730 (the human 100).

In the specific example, an "arrow" that indicates the direction in which the car 730 is predicted to travel (the travel direction to be changed) at the travel direction change point 351 is used as the first display object 301. However, in the embodiment, the configuration of the first display object 301 is arbitrary; and the first display object 301 may include any shape such as a polygon and the like, characters, etc. In other words, it is sufficient for the first display object 301 to indicate the travel direction of the car 730 at the travel direction change point 351.

In the specific example, a two-dimensional pattern similar to a traffic sign is used as the first display object 301. Thereby, there is consistency with the traffic signs provided at the road 341 on which the car 730 travels; and the human 100 can easily understand the content indicated by the first display object 301.

Thus, the first display object 301 may have a pattern configuration used as a traffic sign (including a regulatory sign, a warning sign, a guide sign, an information sign, etc.) or a modification thereof. The first display object 301 may have a configuration in which shapes and characters are combined. Thereby, easier viewing and easier decisions are possible. In the case where the road 341 on which the car 730 is travelling has multiple lanes (traffic lanes 341T) as illustrated in FIG. 1A and FIG. 1B, easier viewing and easier decisions are possible by further displaying the lanes by shapes, etc. That is, the image data generation unit 130 may generate the image data relating to the image 330 further including a first pattern 301L to indicate the traffic lane 341T when the distance between the travel direction change point 351 and the vehicle (the car 730) is the first distance. The first pattern 301L has, for example, a band configuration extending in a vertical direction in the image 330.

As shown in FIG. 1C and FIG. 1D, when the distance between the travel direction change point 351 and the car 730 is a second distance which is shorter than the first distance, a second display object 302 is displayed to correspond to the position of the travel direction change point 351. The second display object 302 has a configuration different from that of the first display object 301 to indicate the travel direction of the car 730 at the travel direction change point 351. The second distance, which is the case L2C where the distance between the travel direction change point 351 and the car 730 is short, is, for example, not more than 40 m.

In the specific example, the second display object 302 is a "multiple triangular pattern" indicating the direction in which the car 730 is predicted to travel (the travel direction to be changed) at the travel direction change point 351. The axis of the "triangular pattern" of the upper portion of the "multiple triangular pattern" is disposed in the left direction which is the direction to which the travel direction is changed.

As illustrated in FIG. 1D, the second display object 302 is displayed to correspond to the position of the travel direction change point 351. In other words, the lower portion of the "multiple triangular pattern" is superimposed onto the image of the road 341 on which the car 730 is travelling. The upper portion of the "multiple triangular pattern" is superimposed in the extension direction of the branch road 342 that branches where the travel direction of the car 730 changes.

Thus, the second display object 302 is displayed to correspond to the position of the travel direction change point 351 while having a configuration different from that of the first display object 301.

Thus, when the human 100 is proximal to the travel direction change point 351, the human 100 can more easily perceive the travel direction change point 351 and can more easily perceive the travel direction at the travel direction change point 351 by the second display object 302 being displayed to correspond to the position of the travel direction change point 351. Thereby, the operator, i.e., the human 100, can more easily execute the operation of the car 730.

By the first display object 301 being displayed when distal to the travel direction change point 351 prior to the second display object 302 being displayed when proximal to the travel direction change point 351, the operator, i.e., the human 100, can make the decision sufficiently prior to the operation to change the travel direction. By effectively making the decision, easier use and safer operations can be realized.

In such a case, the human 100 can more easily perceive that the travel direction change point 351 has approached by the first display object 301 being displayed first using the configuration used as the traffic sign (including the regulatory sign, the warning sign, the guide sign, the information sign, etc.) when distal to the travel direction change point 351, and subsequently by the second display object 302 that has the configuration different from that of the first display object 301 being displayed when proximal to the travel direction change point 351.

Thus, the image data generation unit 130 generates the image data including the first display object 301 that indicates the travel direction of the car 730 at the travel direction change point 351 when the distance between the travel direction change point 351 and the car 730 is the first distance, where the travel direction change point 351 is the point where the travel direction of the car 730 is predicted to be changed based on the travel route determined in relation to the car 730.

Then, the image data generation unit 130 generates the image data including the second display object 302 that is displayed to correspond to the position of the travel direction change point 351 when the distance between the travel direction change point 351 and the car 730 is the second distance which is shorter than the first distance, where the second display object 302 has a configuration different from that of the first display object 301 to indicate the travel direction of the car 730 at the travel direction change point 351.

Thereby, a HUD-type display apparatus can be provided for easier decisions by the human 100 operating the vehicle (the car 730).

In such a case, the image projection unit 115 of the display apparatus 10 can project the light flux 112 including the image including the second display object 302 onto the one eye 101 of the human 100. Thereby, the difficulty of viewing due to the binocular parallax when viewing with both eyes is eliminated; and it can be easy for the second display object 302 to be perceived at the desired depthward position. Thereby, when the second display object 302 is displayed to correspond to the position of the travel direction change point 351, the second display object 302 is perceived at the depthward position of the travel direction change point 351; and the travel direction change point 351 and the change direction of the travel direction at the travel direction change point 351 can be more easily perceived.

It is desirable for the second display object 302 to have a configuration that gives the human 100 a sense of perspective (depth). Thereby, the human 100 can more easily perceive the travel direction change point 351 and the change direction of the travel direction at the travel direction change point 351.

For example, as shown in FIG. 1C and FIG. 1D, the configuration of the second display object 302 is large at the lower side of the image 330 (the lower side as viewed from the human 100) and small at the upper side of the image 330 (the upper side as viewed from the human 100). A size of a portion of the second display object 302 positioned in a lower side in the image 330 is larger than a size of a portion of the second display object 302 positioned in an upper side in the image 330.

In the specific example, the image 330 is displayed on the lower side as viewed from the human 100, i.e., the side of the road on which the car 730 in which the human 100 rides is travelling. Therefore, the lower side of the image 330 corresponds to the side proximal to the human 100; and the upper side of the image 330 corresponds to the side distal to the human 100.

This relationship is inverted in the case where the image 330 is displayed on the upper side as viewed from the human 100, that is, on the upper side of the road (e.g., a ceiling such as a tunnel, etc.) on which the car 730 in which the human 100 rides is travelling. Hereinbelow, the case is described where the image 330 is displayed on the lower side as viewed from the human 100, the lower side of the image 330 corresponds to the side proximal to the human 100, and the upper side of the image 330 corresponds to the side distal to the human 100.

As illustrated in FIG. 1C and FIG. 1D, a position inside the image 330 corresponding to the travel direction change point 351 is taken as a first intra-image position 361. A position inside the image 330 corresponding to a point that is more proximal to the car 730 than is the travel direction change point 351 is taken as a second intra-image position 362. The first intra-image position 361 is more toward the upper side than is the second intra-image position 362 inside the image 330. In such a case, the second display object 302 on the first intra-image position 361 side inside the image 330 is small; and the second display object 302 on the second intra-image position 362 side inside the image 330 is large.

Thus, the second display object 302 gives the human 100 a sense of perspective by the size of the second display object 302 on the first intra-image position 361 side inside the image 330 corresponding to the travel direction change point 351 being smaller than the size of the second display object 302 on the second intra-image position 362 side inside the image 330 corresponding to the point that is more proximal to the car 730 than is the travel direction change point 351. Thereby, the travel direction change point 351 and the change direction of the travel direction at the travel direction change point 351 can be more easily perceived. On the other hand, the first display object 301 may not give the human 100 the sense of perspective. For example, a size of a portion of the first display object 301 positioned in the lower side in the image 330 is same as a size of a portion of the first display object 301 positioned in the upper side in the image 330.

Further, the second display object 302 can be changed with the passage of time.

FIG. 3A to FIG. 3E are schematic views illustrating other operations of the display apparatus according to the first embodiment.

Figure 3A:
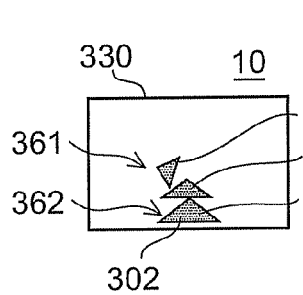
FIGS. 3A to 3E are schematic views illustrating another operation of the display apparatus according to the first embodiment.
Figure 3B:
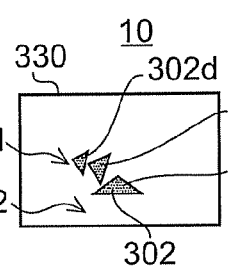
Figure 3C:
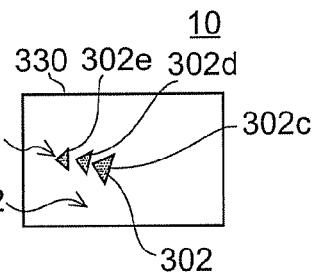
Figure 3D:
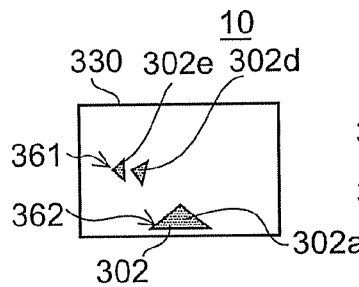
Figure 3E:
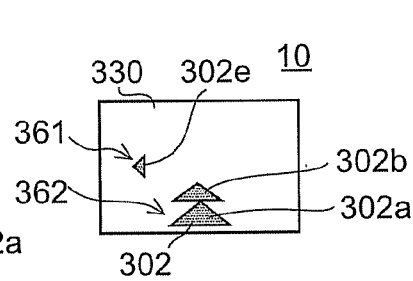

Namely, FIG. 3A to FIG. 3E illustrate display states of the second display object 302 of the display apparatus 10. FIG. 3B corresponds to a time after FIG. 3A; and FIG. 3C corresponds to a time after FIG. 3B. FIG. 3D corresponds to a time after FIG. 3C; and FIG. 3E corresponds to a time after FIG. 3D.

In the specific example as shown in FIG. 3A to FIG. 3E, the second display object 302 changes temporally. Thereby, the human 100 can view the changing image; and the human 100 can more easily perceive the second display object 302.

In the specific example, the second display object 302 further includes multiple display object components 302a to 302e that are intermittently arranged from the second intra-image position 362 inside the image 330 corresponding to the point that is more proximal to the car 730 than is the travel direction change point 351 to the first intra-image position 361 inside the image 330 corresponding to the travel direction change point 351. The display object components 302a to 302e are arranged in this order from the side proximal to the car 730 (the side proximal to the human 100) to the side distal to the car 730 (the side distal to the human 100, i.e., the side proximal to the travel direction change point 351).

In the specific example as shown in FIG. 3A to FIG. 3E, first, the display object components 302a, 302b, and 302c are displayed; and subsequently, the display object components 302b, 302c, and 302d are displayed. Subsequently, the display object components 302c, 302d, and 302e are displayed; subsequently, the display object components 302d, 302e, and 302a are displayed; and subsequently, the display object components 302e, 302a, and 302b are displayed. Then, the display again returns from the state of FIG. 3E to the state of FIG. 3A; and the display of these states is repeated.

In other words, of the multiple display object components 302a to 302e, the first display object component (e.g., the display object component 302a) vanishes temporally before the second display object component (e.g., the display object component 302b) that is disposed further on the first intra-image position 361 side than is the first display object component (e.g., the display object component 302a).

Thereby, the multiple display object components 302a to 302e are perceived to move by flowing. By using such a second display object 302, the human 100 can more easily perceive the second display object 302.

In the specific example, the axis of the display object component 302a is aligned along the current travel direction of the car 730. The axis of the display object component 302e is aligned along the direction in which the car 730 is predicted to travel. The axes of the display object components 302b, 302c, and 302d are aligned along intermediate directions between the axis of the display object component 302a and the axis of the display object component 302e; and the axes of the display object components 302a to 302e continuously change.

Then, the axes of the display object components 302a to 302e continuously rotate around an axis from the current travel direction of the car 730 to the travel direction after the travel direction is changed from the display object component 302a to the display object component 302e. Thereby, the human 100 can more easily perceive the travel direction in which the car 730 is predicted to travel that is indicated by the second display object 302.

FIG. 4A to FIG. 4E are schematic views illustrating other operations of the display apparatus according to the first embodiment.

Figure 4A:
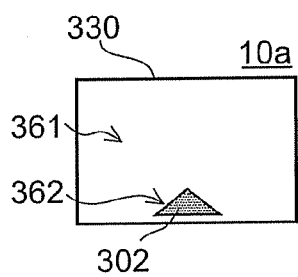
FIGS. 4A to 4E are schematic views illustrating the operation of another display apparatus according to the first embodiment.
Figure 4B:
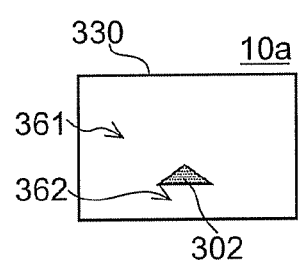
Figure 4C:
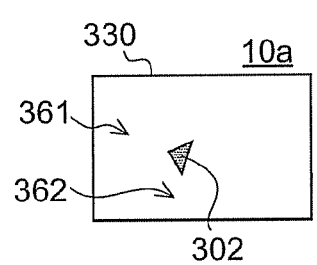
Figure 4D:
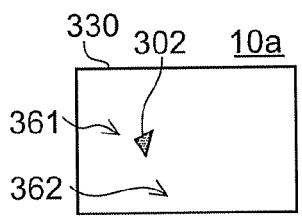
Figure 4E:
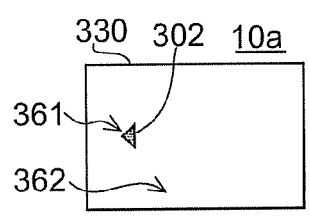

Namely, FIG. 4A to FIG. 4E illustrate display states of the second display object 302 of display apparatus 10a according to the embodiment. FIG. 4B corresponds to a time after FIG. 4A; FIG. 4C corresponds to a time after FIG. 4B; FIG. 4D corresponds to a time after FIG. 4C; and FIG. 4E corresponds to a time after FIG. 4D. The configuration of the display apparatus 10a is similar to that of the display apparatus 10; and the display of the second display object 302 in the display apparatus 10a is different from that of the display apparatus 10.

In the display apparatus 10a as shown in FIG. 4A to FIG. 4E, the second display object 302 moves through the image 330. In other words, the second display object 302 moves from the second intra-image position 362 inside the image 330 corresponding to the point that is more proximal to the car 730 than is the travel direction change point 351 toward the first intra-image position 361 inside the image 330 corresponding to the travel direction change point 351. In this case, the second display object 302 moves while the size of the second display object 302 changes. That is, the size and the position in the image 330 of the second display object 302 are changed temporally. The color of the second display object 302 may be changed.

Thus, the human 100 can more easily perceive the second display object 302 by the second display object 302 changing and moving through the image 330. The movement speed of the second display object 302 can be arbitrarily set; and the movement speed may be changed, for example, according to the change of the distance between the travel direction change point 351 and the car 730.

Although the entire second display object 302 moves through the image 330 in the specific example, a portion of the second display object 302 may move through the image 330. Such a case corresponds to the configuration of the second display object 302 deforming.

Thus, at least a portion of the second display object 302 may move between the second intra-image position 362 inside the image 330 corresponding to the point that is more proximal to the car 730 than is the travel direction change point 351 and the first intra-image position 361 inside the image 330 corresponding to the travel direction change point 351.

FIG. 5A to FIG. 5D are schematic views illustrating operations of another display apparatus according to the first embodiment.

Figure 5A:
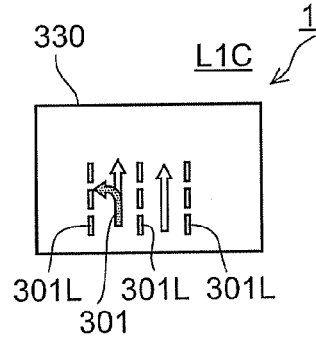
FIGS. 5A to 5D are schematic views illustrating the operation of another display apparatus according to the first embodiment.
Figure 5B:
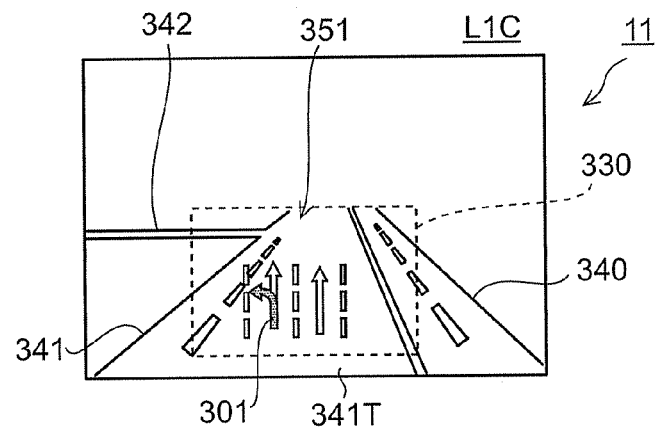
Figure 5C:
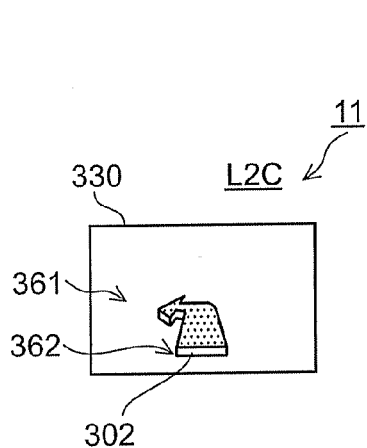
Figure 5D:
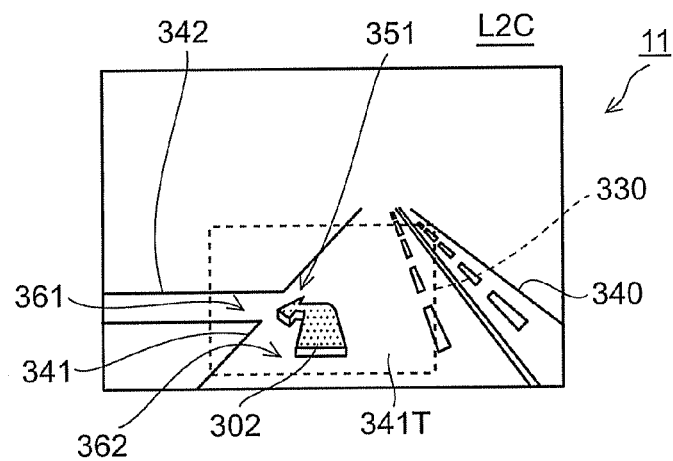

Namely, FIG. 5A to FIG. 5D illustrate display states of the display apparatus 11 according to the embodiment. FIG. 5A and FIG. 5B correspond to the case L1C where the distance between the travel direction change point 351 and the car 730 is long; and FIG. 5C and FIG. 5D correspond to the case L2C where the distance between the travel direction change point 351 and the car 730 is short. FIG. 5A and FIG. 5C illustrate the image 330 that the human 100 views; and FIG. 5B and FIG. 5D schematically show the image when the human 100 simultaneously views the image 330 and the image 340 frontward of the car 730.

As shown in FIG. 5A and FIG. 5B, the first display object 301 that is displayed in the case L1C where the distance between the travel direction change point 351 and the car 730 is long is the same as that of the display apparatus 10.

On the other hand, in the display apparatus 11 according to the embodiment as shown in FIG. 5C and FIG. 5D, an "arrow" is used as the second display object 302 that is displayed in the case L1C where the distance between the travel direction change point 351 and the car 730 is long.

In such a case as well, the second display object 302 has a configuration that gives the human 100 a sense of perspective. In other words, the size of the second display object 302 on the first intra-image position 361 side inside the image 330 corresponding to the travel direction change point 351 is smaller than the size of the second display object 302 on the second intra-image position 362 side inside the image 330 corresponding to the point that is more proximal to the car 730 than is the travel direction change point 351.

Also, in the specific example, the second display object 302 has a continuous configuration from the second intra-image position 362 inside the image 330 corresponding to the point that is more proximal to the car 730 than is the travel direction change point 351 to the first intra-image position 361 inside the image 330 corresponding to the travel direction change point 351.

Thereby, the travel direction change point 351 and the change direction of the travel direction at the travel direction change point 351 can be more easily perceived.

Further, in the specific example, the second display object 302 changes temporally.

FIG. 6A to FIG. 6E are schematic views illustrating other operations of the display apparatus according to the first embodiment.

Figure 6A:
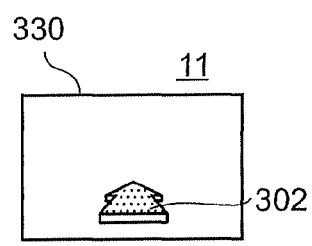
FIGS. 6A to 6E are schematic views illustrating another operation of the display apparatus according to the first embodiment.
Figure 6B:
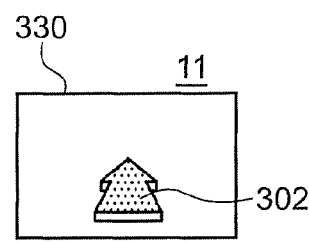
Figure 6C:
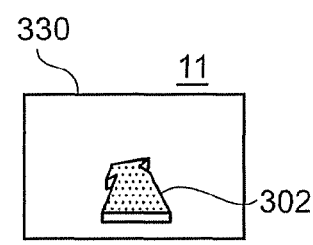
Figure 6D:
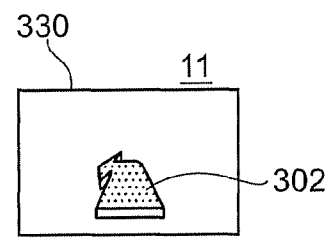
Figure 6E:
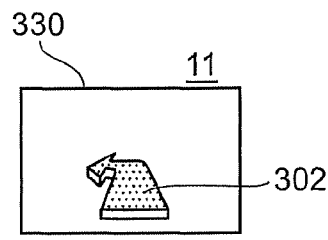

Namely, FIG. 6A to FIG. 6E illustrate display states of the second display object 302 of the display apparatus 11. FIG. 6B corresponds to a time after FIG. 6A; FIG. 6C corresponds to a time after FIG. 6B; FIG. 6D corresponds to a time after FIG. 6C; and FIG. 6E corresponds to a time after FIG. 6D.

As shown in FIG. 6A to FIG. 6E, the configuration of the second display object 302 changes with the passage of time. Namely, the length of the "arrow" of the second display object 302 (the length between the base and the tip of the "arrow") is short in FIG. 3A; and the length of the "arrow" continuously increases when transitioning from FIG. 3B to FIG. 3E. The travel direction is indicated by the direction of the tip of the "arrow".

Thus, the configuration of the second display object 302 may deform by the tip of the "arrow", i.e., a portion of the second display object 302, moving through the image 330.

In other words, at least a portion of the second display object 302 can move between the second intra-image position 362 inside the image 330 corresponding to the point that is more proximal to the car 730 than is the travel direction change point 351 and the first intra-image position 361 inside the image 330 corresponding to the travel direction change point 351.

Further, the second display object 302 may change temporally in at least one of a shape, a position, a size and a color.

FIG. 7A to FIG. 7F are schematic views illustrating operations of another display apparatus according to the first embodiment.

Figure 7A:
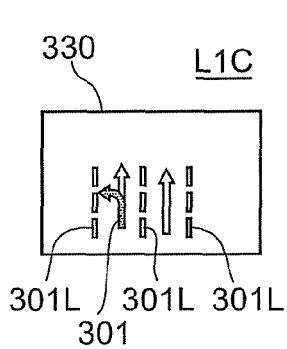
FIGS. 7A to 7F are schematic views illustrating the operation of another display apparatus according to the first embodiment.
Figure 7B:
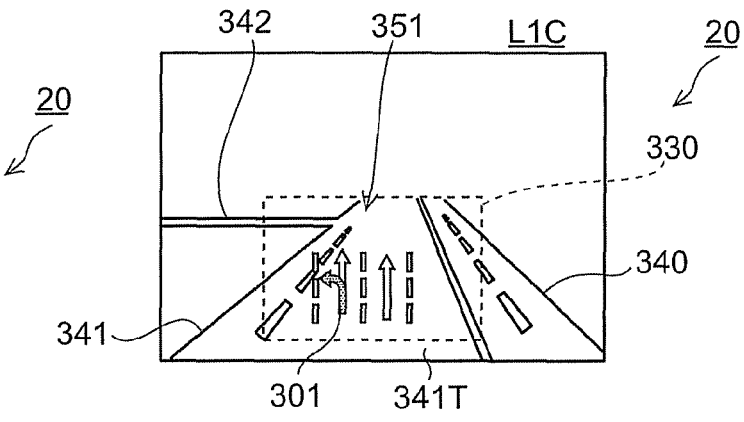
Figure 7C:
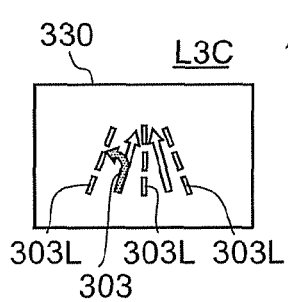
Figure 7D:
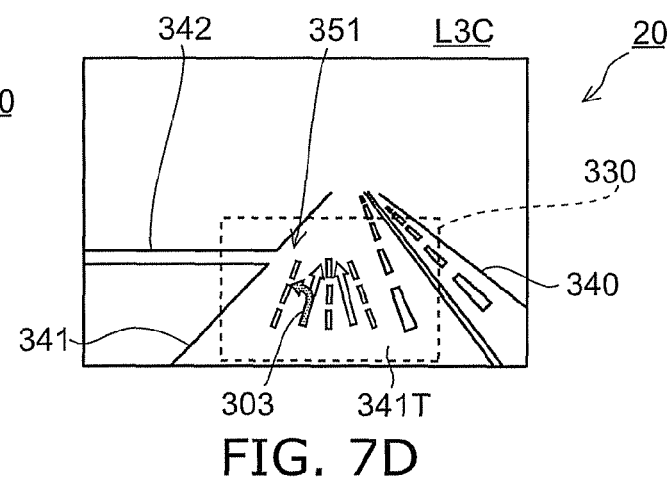
Figure 7E:
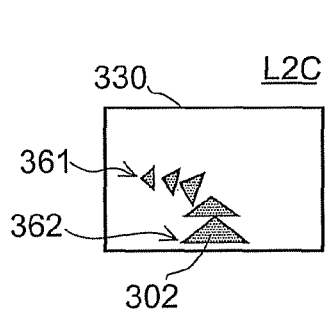
Figure 7F:
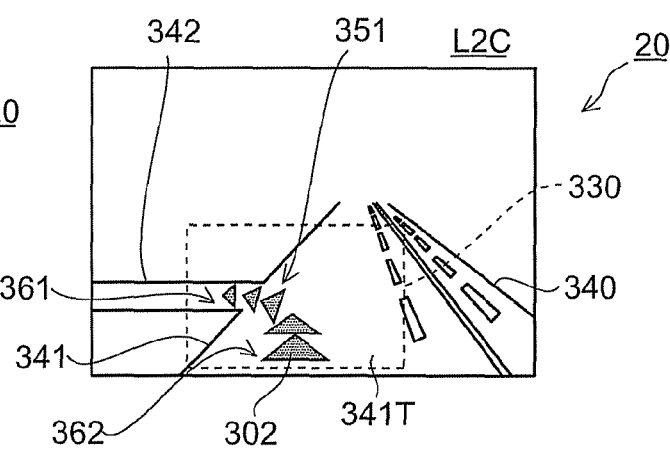

Namely, FIG. 7A to FIG. 7F illustrate display states of the display apparatus 20 according to the embodiment. FIG. 7A and FIG. 7B correspond to the case L1C where the distance between the travel direction change point 351 and the car 730 is long; FIG. 7C and FIG. 7D correspond to a case L3C where the distance between the travel direction change point 351 and the car 730 is intermediate; and FIG. 7E and FIG. 7F correspond to the case L2C where the distance between the travel direction change point 351 and the car 730 is short. FIG. 7A, FIG. 7C, and FIG. 7E illustrate the image 330 that the human 100 views; and FIG. 7B, FIG. 7D, and FIG. 7F schematically show the image when the human 100 simultaneously views the image 330 and the image 340 frontward of the car 730.

As shown in FIG. 7A, FIG. 7B, FIG. 7E, and FIG. 7F, the first display object 301 that is displayed in the case L1C where the distance between the travel direction change point 351 and the car 730 is long and the second display object 302 that is displayed in the case L2C where the distance between the travel direction change point 351 and the car 730 is short are the same as those of the display apparatus 10.

On the other hand, in the display apparatus 20 according to the embodiment as shown in FIG. 7C and FIG. 7D, a third display object 303 is displayed in the case L3C where the distance between the travel direction change point 351 and the car 730 is intermediate.

In other words, the third display object 303 is displayed when the distance between the travel direction change point 351 and the car 730 is the third distance which is between the first distance and the second distance. The third display object 303 has a configuration different from those of the first display object 301 and the second display object 302 to indicate the travel direction of the car 730 at the travel direction change point 351. The third distance may be any distance between the first distance and the second distance.

In the specific example, the configuration of the third display object 303 is a deformed configuration of the first display object 301. In other words, for the configuration of the third display object 303, the configuration of the first display object 301 is deformed such that the upper portion is relatively smaller than the lower portion. Thereby, the third display object 303 can give the human 100 a sense of perspective.

In other words, while the first display object 301 is a two-dimensional shape without a sense of perspective in the specific example, the third display object 303 is a three-dimensional shape that gives a sense of perspective. When the human 100 views the third display object 303, the human 100 perceives that the first display object 301 rotates such that the upper portion of the first display object 301 moves away from the human 100 and the lower portion of the first display object 301 moves toward the human 100.

Thus, the human 100 can perceive that the travel direction change point 351 is more proximal by a deformed configuration of the first display object 301 being used as the configuration of the third display object 303.

Also, the human 100 can perceive that the travel direction change point 351 is more proximal without incongruity by a deformed configuration of the first display object 301 being used as the configuration of the third display object 303 without the configuration of the third display object 303 having absolutely no similarity to that of the first display object 301. In other words, by seamlessly changing the content of the image 330 from the first display object 301 to the third display object 303, the human 100 can perceive the travel direction change point 351 with less incongruity; and the decision by the human 100 operating the car 730 can be easier.

Further, the second display object 302 is displayed after displaying the third display object 303 which is displayed after the first display object 301. Therefore, there can be less incongruity than in the case where the second display object 302 is displayed directly after the first display object 301; and the decision by the human 100 operating the car 730 can be easier.

Thus, the image data generation unit 130 may further generate the image data relating to the image 330 to include the third display object 303 when the distance between the travel direction change point 351 and the car 730 is the third distance between the first distance and the second distance. This image 330 has a configuration different from those of the first display object 301 and the second display object 302 to indicate the travel direction of the car 730 at the travel direction change point 351.

In such a case, the size of the third display object 303 on the first intra-image position 361 side inside the image 330 corresponding to the travel direction change point 351 may be smaller than the third display object 303 on the second intra-image position 362 side inside the image 330 corresponding to the point that is more proximal to the car 730 than is the travel direction change point 351.

Thereby, the third display object 303 gives the human 100 a sense of perspective; the perception becomes smoother between, for example, the first display object 301 that is displayed in a two-dimensional configuration and the second display object 302 that is displayed in a three-dimensional configuration; and the decision by the human 100 operating the car 730 can be easier.

As shown in FIG. 7C, in this example, the image data generation unit 130 is configured to generate the image data relating to the image 330 further including a second pattern 303L to indicate the traffic lane 341T when the distance between the travel direction change point 351 and the vehicle (car 730) is the third distance. The second pattern 303L includes a plurality of band configurations. A distance between the band configurations in an upper side portion in the image 330 is smaller than a distance between the band configurations in lower side portion in the image 330. Thereby, the third display object 303 can give the human 100 the sense of perspective.

Also, the content of the image 330 may be caused to continuously transition from the first display object 301 to the third display object 303.

FIG. 8A to FIG. 8D are schematic views illustrating operations of another display apparatus according to the first embodiment.

Figure 8A:
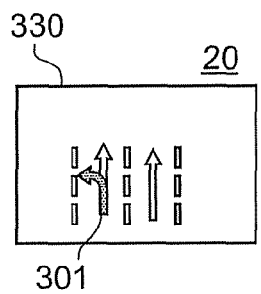
FIGS. 8A to 8D are schematic views illustrating the operation of another display apparatus according to the first embodiment.
Figure 8B:
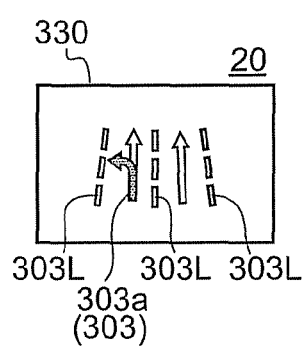
Figure 8C:
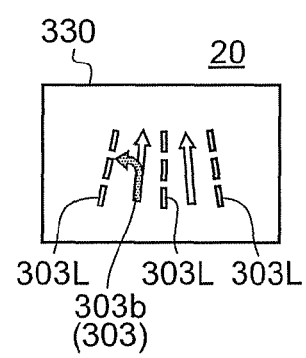

Namely, FIG. 8A to FIG. 8D illustrate display states of the first display object 301 and the third display object 303 of the display apparatus 20. FIG. 8B corresponds to a time after FIG. 8A; FIG. 8C corresponds to a time after FIG. 8B; and FIG. 8D corresponds to a time after FIG. 8C.

As shown in FIG. 8A, the first display object 301 is displayed first.

Subsequently, as shown in FIG. 8B, the first display object 301 is deformed such that the upper portion of the first display object 301 tilts depthward, that is, such that the upper portion of the first display object 301 becomes relatively smaller than the lower portion to display a first intermediate display object 303a of an intermediate state.

Subsequently, as shown in FIG. 8C, the first intermediate display object 303a is deformed such that the upper portion of the first intermediate display object 303a becomes relatively smaller than the lower portion to display a second intermediate display object 303b.

Figure 8D:
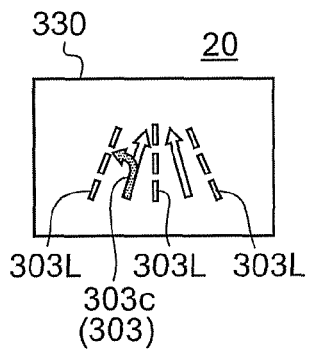

Subsequently, as shown in FIG. 8D, the second intermediate display object 303b is deformed such that the upper portion of the second intermediate display object 303b becomes relatively smaller than the lower portion to display a final display object 303c.

The first intermediate display object 303a, the second intermediate display object 303b, and the final display object 303c can be considered to be a portion of the third display object 303. In other words, the first intermediate display object 303a, the second intermediate display object 303b, and the final display object 303c can be considered to be states in which the configuration of the third display object 303 changes temporally. In other words, the third display object 303 may change temporally.

Thus, by continuously performing the transition from the first display object 301 to the third display object 303, the incongruity can be reduced further; and the decision by the human 100 operating the car 730 can be easier.

FIG. 9A to FIG. 9F are schematic views illustrating operations of another display apparatus according to the first embodiment.

Figure 9A:
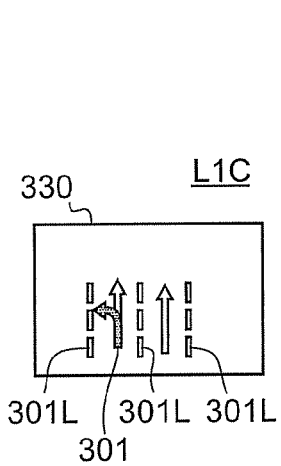
FIGS. 9A to 9F are schematic views illustrating the operation of another display apparatus according to the first embodiment.
Figure 9B:
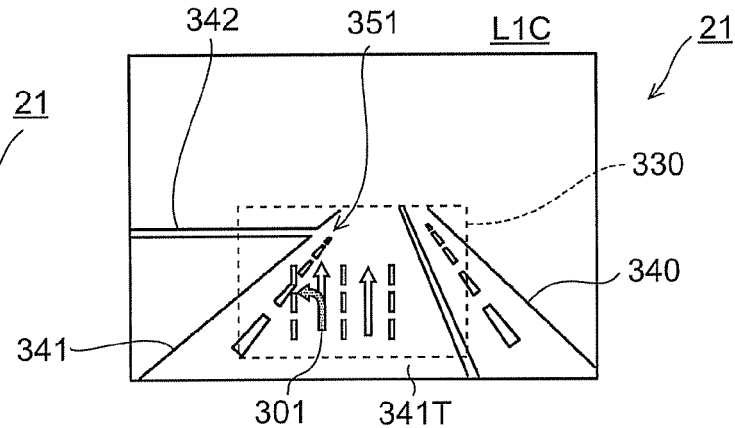
Figure 9C:
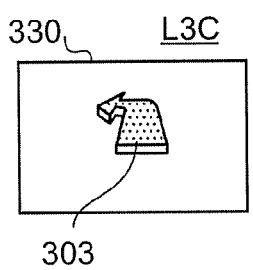
Figure 9D:
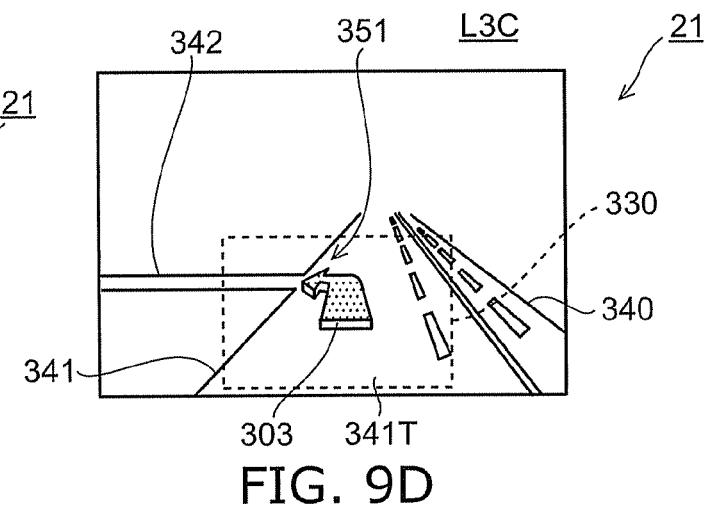
Figure 9E:
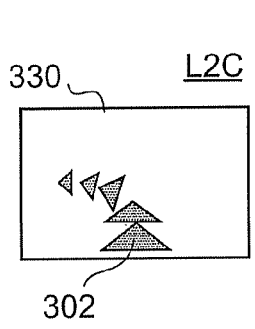
Figure 9F:
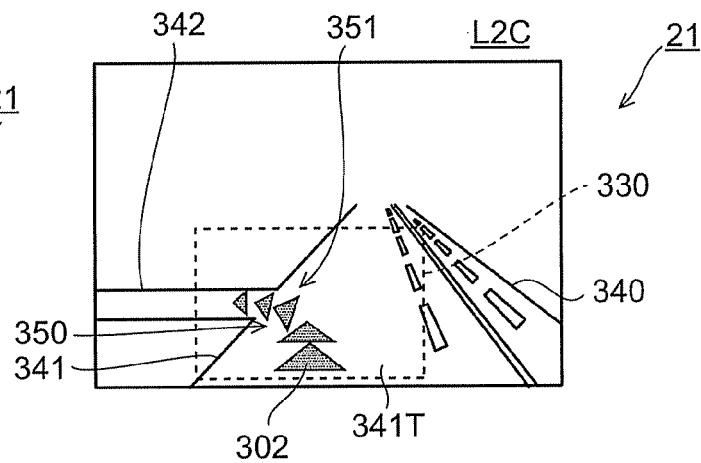

Namely, FIG. 9A to FIG. 9F illustrate display states of the display apparatus 21 according to the embodiment. FIG. 9A and FIG. 9B correspond to the case L1C where the distance between the travel direction change point 351 and the car 730 is long; FIG. 9C and FIG. 9D correspond to the case L3C where the distance between the travel direction change point 351 and the car 730 is intermediate; and FIG. 9E and FIG. 9F correspond to the case L2C where the distance between the travel direction change point 351 and the car 730 is short. FIG. 9A, FIG. 9C, and FIG. 9E illustrate the image 330 that the human 100 views; and FIG. 9B, FIG. 9D, and FIG. 9F schematically illustrate the image when the human 100 simultaneously views the image 330 and the image 340 frontward of the car 730.

As shown in FIG. 9A, FIG. 9B, FIG. 9E, and FIG. 9F, the first display object 301 that is displayed in the case L1C where the distance between the travel direction change point 351 and the car 730 is long and the second display object 302 that is displayed in the case L2C where the distance between the travel direction change point 351 and the car 730 is short are the same as the display states of the display apparatus 20.

On the other hand, in the display apparatus 21 as shown in FIG. 9C and FIG. 9D, an "arrow" is used as the third display object 303.

The specific example is an example in which the third display object 303 is displayed to correspond to the position of the travel direction change point 351.

In such a case as well, the size of the third display object 303 on the first intra-image position 361 side inside the image 330 corresponding to the travel direction change point 351 is smaller than the size of the third display object 303 on the second intra-image position 362 side inside the image 330 corresponding to the point that is more proximal to the car 730 than is the travel direction change point 351.

In such a case as well, the content of the image 330 may be caused to continuously transition from the first display object 301 to the third display object 303.

FIG. 10A to FIG. 10F are schematic views illustrating operations of another display apparatus according to the first embodiment.

Figure 10A:
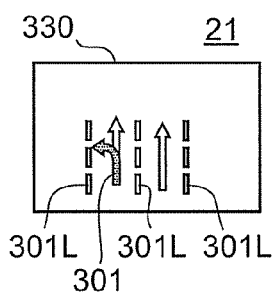
FIGS. 10A to 10F are schematic views illustrating the operation of another display apparatus according to the first embodiment.
Figure 10B:
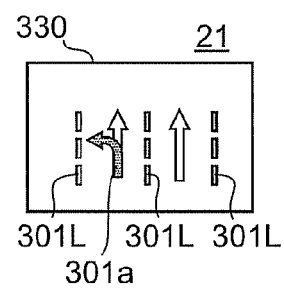
Figure 10C:
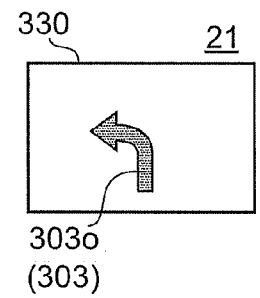
Figure 10D:
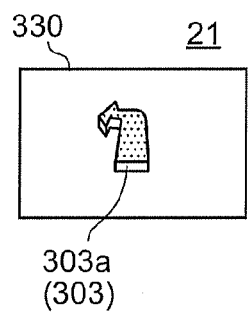
Figure 10E:
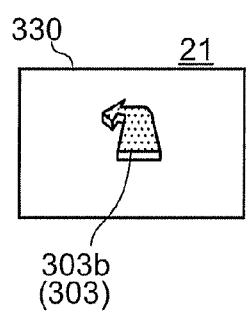

Namely, FIG. 10A to FIG. 10F illustrate display states of the first display object 301 and the third display object 303 of the display apparatus 21. FIG. 10B corresponds to a time after FIG. 10A; FIG. 10C corresponds to a time after FIG. 10B; FIG. 10D corresponds to a time after FIG. 10C; FIG. 10E corresponds to a time after FIG. 10D; and FIG. 10F corresponds to a time after FIG. 10E.

First, as shown in FIG. 10A, the first display object 301 is displayed. Subsequently, as shown in FIG. 10B, the first display object 301 is deformed such that the upper portion of the first display object 301 tilts depthward, that is, such that the upper portion of the first display object 301 becomes relatively smaller than the lower portion to display an intermediate display object 301a.

Subsequently, as shown in FIG. 10C, the displays illustrating the route divisions, etc., vanish; and a two-dimensional intermediate display object 303o that has a configuration of only the arrow portion of the first display object 301 is displayed. For example, the two-dimensional intermediate display object 303o has a two-dimensional configuration that is similar to a traffic sign.

Subsequently, as shown in FIG. 10D, the two-dimensional intermediate display object 303o is deformed such that the upper portion of the two-dimensional intermediate display object 303o is relatively smaller than the lower portion to display the first intermediate display object 303a.

Subsequently, as shown in FIG. 10E, the first intermediate display object 303a is deformed further such that the upper portion of the first intermediate display object 303a is relatively smaller than the lower portion to display the second intermediate display object 303b.

Figure 10F:
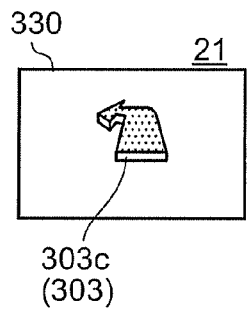

Subsequently, as shown in FIG. 10F, the second intermediate display object 303b is deformed further such that the upper portion of the second intermediate display object 303b is relatively smaller than the lower portion to display the final display object 303c.

The intermediate display object 301a, the two-dimensional intermediate display object 303o, the first intermediate display object 303a, the second intermediate display object 303b, and the final display object 303c can be considered to be portions of the third display object 303. These display objects can be considered to be the configuration of the third display object 303 changing temporally. In other words, the third display object 303 may change temporally.

Further, the third display object 303 may change temporally in at least one of a shape, a position, a size and a color.

Also, the intermediate display object 301a can be considered to be a deformed first display object 301. Thus, the first display object 301 may be deformed when transitioning to the third display object 303.

Thus, by continuously performing the transition from the first display object 301 to the third display object 303, the incongruity can be reduced further; and the decision by the human 100 operating the car 730 can be easier.

The third display object 303 may include a continuous configuration (e.g., an "arrow") from the second intra-image position 362 inside the image 330 corresponding to the point that is more proximal to the car 730 than is the travel direction change point 351 to the first intra-image position 361 inside the image 330 corresponding to the travel direction change point 351.

In such a case, at least a portion of the third display object 303 may move between the second intra-image position 362 and the first intra-image position 361. In other words, the configuration of the "arrow" and the like of the third display object 303 may be deformed.

Also, the third display object 303 may include multiple display object components that are intermittently arranged from the second intra-image position 362 to the first intra-image position 361. In other words, the third display object 303 may have the configuration of the "multiple triangular pattern" illustrated in FIG. 1C and FIG. 1D. On the other hand, in such a case, the second display object 302 may have, for example, a configuration such as an "arrow", etc.

In such a case as well, the first display object component of the multiple display object components included in the third display object 303 may vanish temporally before the second display object component, which is disposed further on the first intra-image position 361 side than is the first display object component, vanishes.

Thereby, the decision by the human 100 operating the car 730 can be easier.

Thus, in some cases, the configuration of the second display object 302 and the configuration of the third display object 303 are mutually interchangeable in the method described with reference to FIG. 9A to FIG. 9F.

In such a case, at least one selected from the second display object 302 and the third display object 303 may have a continuous configuration from the second intra-image position 362 inside the image 330 corresponding to the point that is more proximal to the car 730 than is the travel direction change point 351 to the first intra-image position 361 inside the image 330 corresponding to the travel direction change point 351.

Also, at least one selected from the second display object 302 and the third display object 303 may include multiple display object components that are intermittently arranged from the second intra-image position 362 inside the image 330 corresponding to the point that is more proximal to the car 730 than is the travel direction change point 351 to the first intra-image position 361 inside the image 330 corresponding to the travel direction change point 351.

In such a case, the first display object component of the multiple display object components recited above may vanish temporally before the second display object component, which is disposed further on the first intra-image position 361 side than is the first display object component, vanishes.

Also, at least a portion of at least one selected from the second display object 302 and the third display object 303 may be moved between the second intra-image position 362 inside the image 330 corresponding to the point that is more proximal to the car 730 than is the travel direction change point 351 and the first intra-image position 361 inside the image 330 corresponding to the travel direction change point 351.

Thus, in the display apparatus according to the embodiment, the second display object 302 is displayed to correspond to the travel direction change point 351 in the case L2C (in the case of the second distance) where the distance between the travel direction change point 351 and the car 730 is short. By the second display object 302 having a configuration that gives a sense of perspective (a three-dimensional configuration), the travel direction change point 351 and the change direction of the travel direction at the travel direction change point 351 can be more easily perceived.

Then, the first display object 301 is displayed prior to displaying the second display object 302, that is, in the case L1C (in the case of the first distance) where the distance between the travel direction change point 351 and the car 730 is long. Thereby, the human 100 has sufficient time to decide. Then, the first display object 301 can be perceived without incongruity by the first display object 301 having, for example, a two-dimensional configuration similar to a traffic sign.

Further, the third display object 303 is displayed between the display of the first display object 301 and the display of the second display object 302, that is, in the case L3C (in the case of the third distance) where the distance between the travel direction change point 351 and the car 730 is intermediate. The incongruity can be reduced by the characteristics of the third display object 303 having intermediate characteristics between those of the first display object 301 and the second display object 302. For example, in the case where the first display object 301 has a two-dimensional configuration similar to a traffic sign and the second display object 302 has a three-dimensional "multiple triangular pattern" configuration that gives a sense of perspective, the third display object 303 has a three-dimensional configuration in which a pattern similar to a traffic sign is deformed. Thereby, a continuous and seamless display is possible; the incongruity sensed by the human 100 can be reduced; and the display can be perceived more easily.

Thereby, the decision by the human operating the vehicle can be easier. The presentation of information to the auditory sense of the human 100 such as a voice, a warning sound, etc., also may be implemented with the display of the first display object 301, the second display object 302, and the third display object 303 such as those recited above.

FIG. 11A to FIG. 11F are schematic views illustrating operations of another display apparatus according to the first embodiment.

Namely, FIG. 11A to FIG. 11F illustrate display states of the display apparatus 22 according to the embodiment.

Figure 11A:
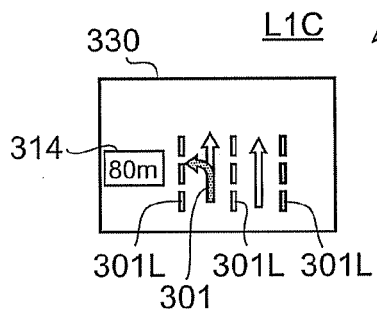
FIGS. 11A to 11F are schematic views illustrating the operation of another display apparatus according to the first embodiment.
Figure 11B:
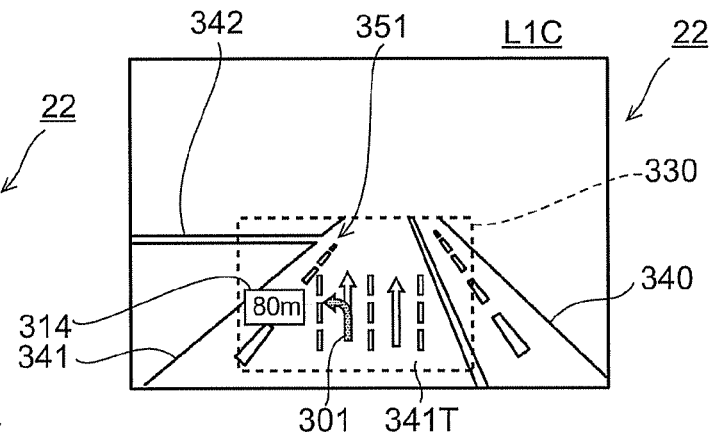

As shown in FIG. 11A and FIG. 11B, a fourth display object 314 that indicates the distance between the travel direction change point 351 and the car 730 (corresponding to the first distance) is displayed with the first display object 301 in the case L1C where the distance between the travel direction change point 351 and the car 730 is long.

Figure 11C:
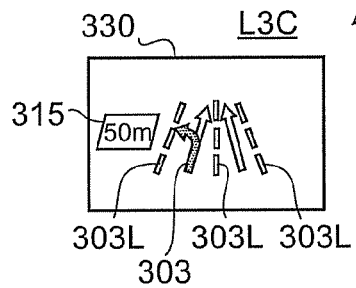
Figure 11D:
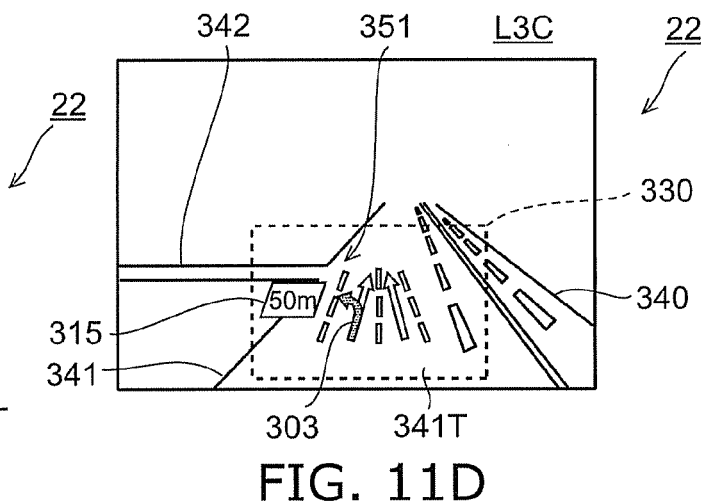
Figure 11E:
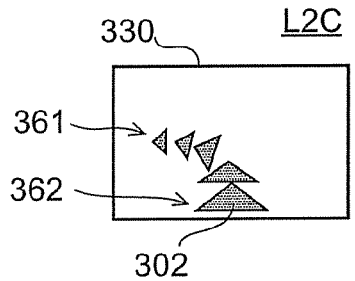
Figure 11F:
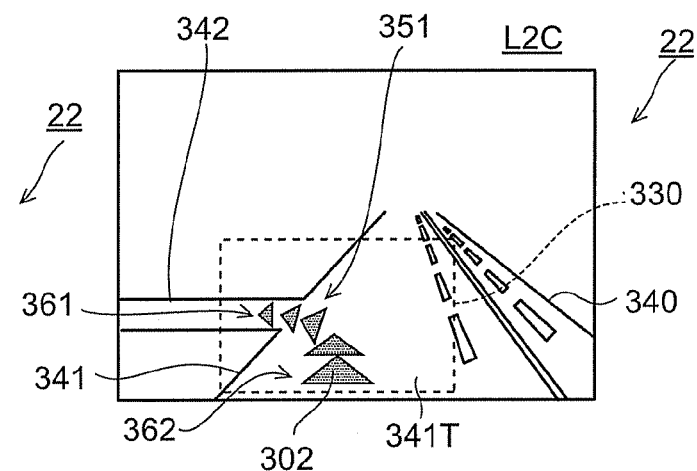

As shown in FIG. 11C and FIG. 11D, a fifth display object 315 that indicates the distance between the travel direction change point 351 and the car 730 (corresponding to the third distance) is displayed with the third display object 303 in the case L3C where the distance between the travel direction change point 351 and the car 730 is intermediate.

The specific example is an example in which the fourth display object 314 and the fifth display object 315 are displayed as characters (numerals).

FIG. 12A to FIG. 12F are schematic views illustrating operations of another display apparatus according to the first embodiment.

Namely, FIG. 12A to FIG. 12F illustrate display states of the display apparatus 23 according to the embodiment.

Figure 12A:
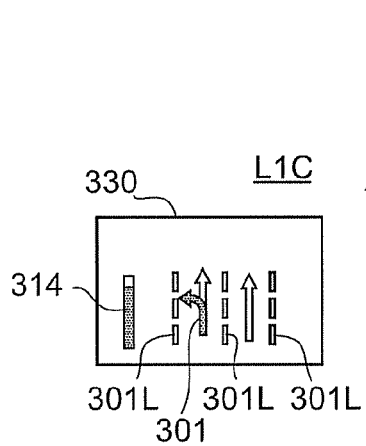
FIGS. 12A to 12F are schematic views illustrating the operation of another display apparatus according to the first embodiment.
Figure 12B:
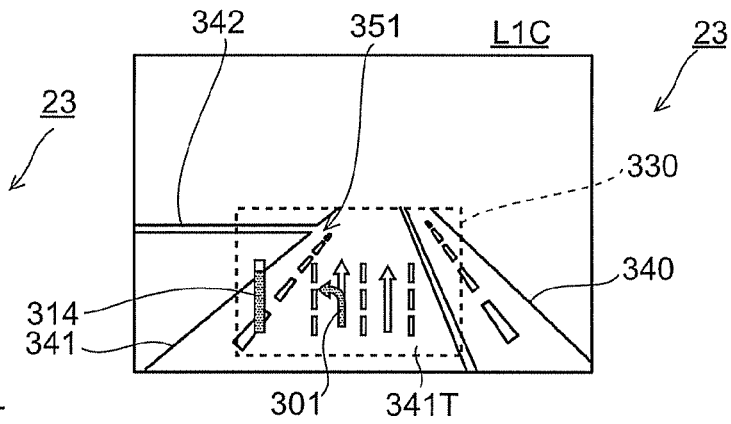

As shown in FIG. 12A and FIG. 12B, the fourth display object 314 is displayed in the case L1C where the distance between the travel direction change point 351 and the car 730 is long.

Figure 12C:
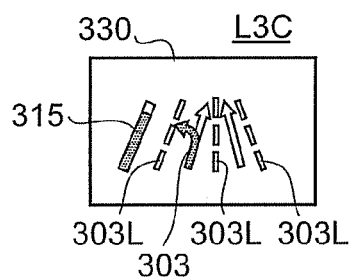
Figure 12D:
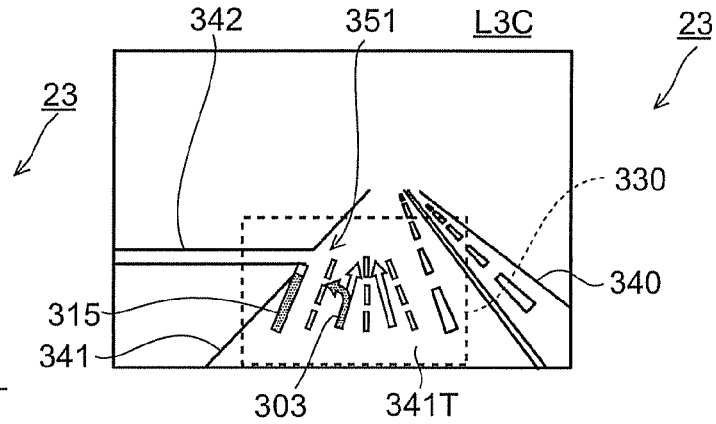
Figure 12E:
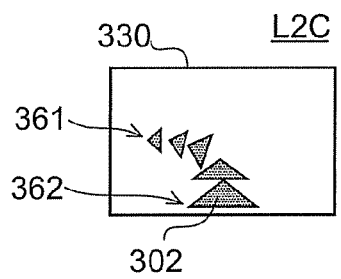
Figure 12F:
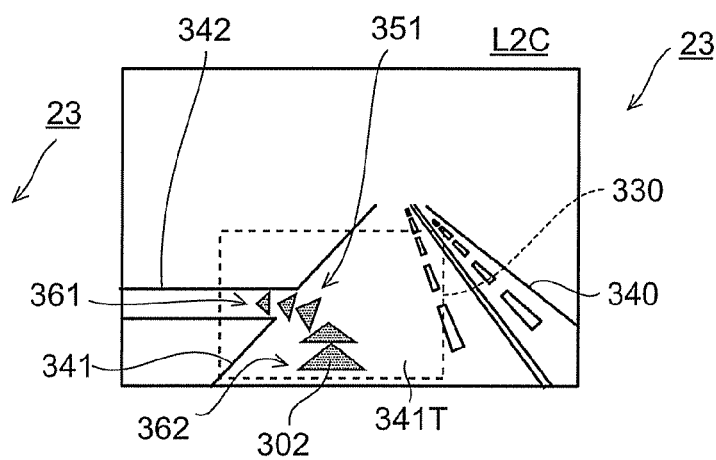

As shown in FIG. 12C and FIG. 12D, the fifth display object 315 is displayed in the case L3C where the distance between the travel direction change point 351 and the car 730 is intermediate.

The specific example is an example in which the fourth display object 314 and the fifth display object 315 are displayed as shapes (bar graphs).

Thus, the display apparatus according to the embodiment may display any display object in addition to the first display object 301, the second display object 302, and the third display object 303.

As illustrated in FIG. 11A and FIG. 12A, it is desirable for the fourth display object 314 illustrating the distance between the travel direction change point 351 and the car 730 to be provided, for example, on the side of the tip of the "arrow" (in the specific example, the left side) of the first display object 301 that indicates the travel direction. As illustrated in FIG. 11C and FIG. 12C, it is desirable for the fifth display object 315 that indicates the distance between the travel direction change point 351 and the car 730 to be provided, for example, on the side of the tip of the "arrow" (in the specific example, the left side) of the third display object 303 that indicates the travel direction. Thereby, the change direction of the travel direction can be more easily perceived.

Figure 13:
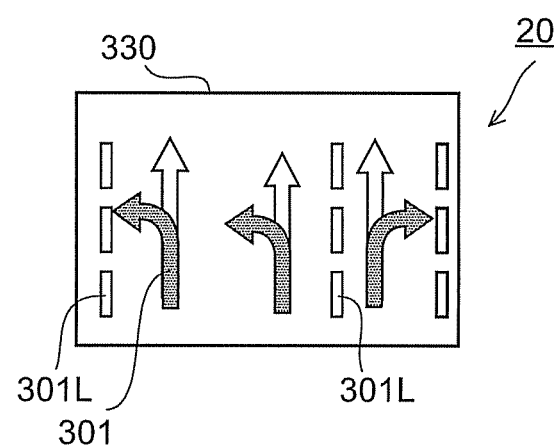
FIG. 13 is a schematic view illustrating another operation of the display apparatus according to the first embodiment.

FIG. 13 is a schematic view illustrating another operation of the display apparatus according to the first embodiment.

Namely, FIG. 13 illustrates another display state of the first display object 301 of the display apparatus 20 described above. In this example in which the travel direction is changed to the left direction at the travel direction change point 351, there are branch roads extending in the right direction other than the branch road 342 that branches when changing the travel direction as the travel direction change point 351 (the intersection) is approached.

In such a case, as shown in FIG. 13, the display of the first display object 301 illustrating the branch road 342 that branches when changing the travel direction is different from the shapes for the other branch roads. Thus, the human 100 can more easily perceive the travel direction.

FIG. 14A to FIG. 14F are schematic views illustrating other operations of the display apparatus according to the first embodiment.

Namely, FIG. 14A to FIG. 14F illustrate other display states of the display apparatus 20 according to the embodiment. The specific example is an example in which the traffic lane 341L of the left side is an upward hill; and the travel direction is changed to the left direction from the traffic lane 341R of the right side by going under the upward hill.

Figure 14A:
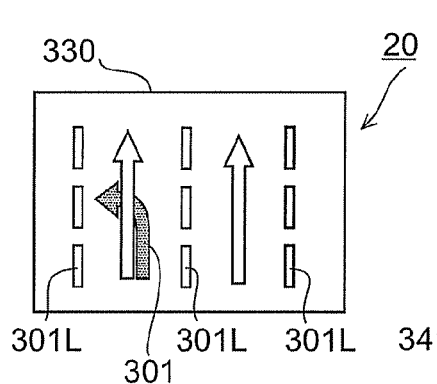
FIGS. 14A to 14F are schematic views illustrating another operation of the display apparatus according to the first embodiment.
Figure 14B:
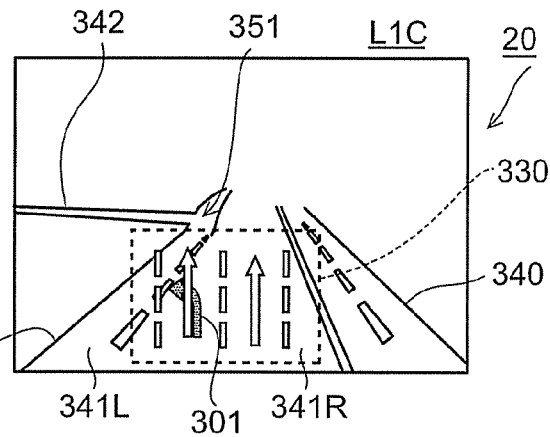

As shown in FIG. 14A and FIG. 14B, the first display object 301 has the configuration of an arrow to change the travel direction to the left direction from the traffic lane 341R of the right side in the case L1C where the distance between the travel direction change point 351 and the car 730 is long. The arrow of the first display object 301 is different from the arrow of the traffic lane 341L of the left side that travels straight on the upward hill. The outline of the arrow of the traffic lane 341L of the left side divides the outline of the arrow (the first display object 301) to change the travel direction to the left direction from the traffic lane 341R of the right side; and the arrow to change the travel direction to the left direction from the traffic lane 341R of the right side is disposed under the arrow of the traffic lane 341L of the left side. Thereby, it is easier to perceive that the travel direction changes to the left direction from the traffic lane 341R of the right side by going under the traffic lane 341L of the left side.

Figure 14C:
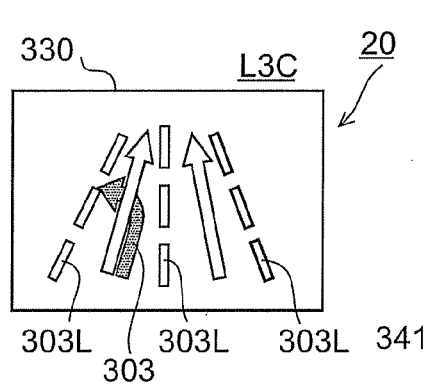
Figure 14D:
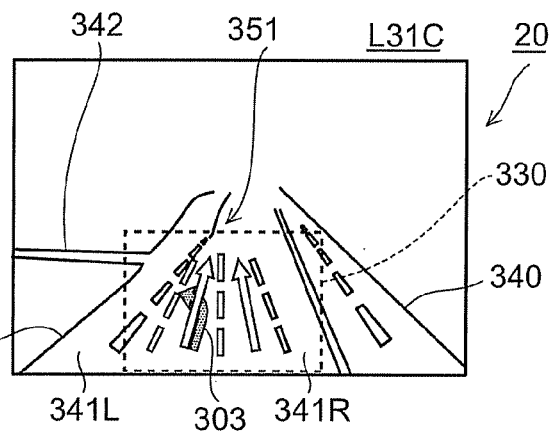

Then, as shown in FIG. 14C and FIG. 14D, similarly to the first display object 301, the third display object 303 having the configuration of the arrow to change the travel direction to the left direction from the traffic lane 341R of the right side is displayed to be disposed under the arrow of the traffic lane 341R of the left side in the case L3C where the distance between the travel direction change point 351 and the car 730 is intermediate.

Figure 14E:
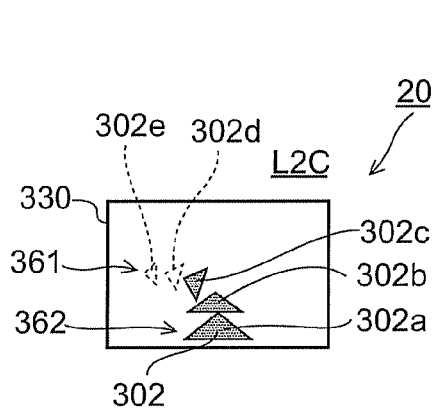
Figure 14F:
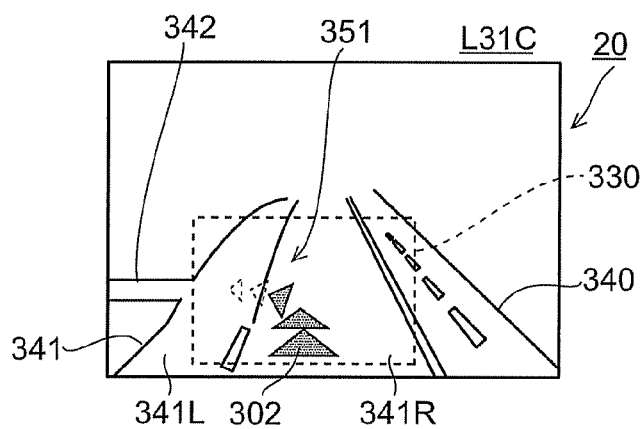

Then, as shown in FIG. 14E and FIG. 14F, the third display object 303 is displayed in the case L2C where the distance between the travel direction change point 351 and the car 730 is short. The third display object 303 includes the multiple display object components 302a to 302e that are intermittently arranged. Of the multiple display object components 302a to 302e, the display object components 302d and 302e corresponding to positions under the travelling lane of the left side (positions shielded by the travelling lane of the left side) are displayed in states that are different from those of the other display object components 302a to 302c.

In the specific example, the outlines of the display object components 302d and 302e are dotted lines; and the display object components 302d and 302e are different from the display object components 302a to 302c. Thereby, it is easier to perceive that the travel direction is changed to the left direction from the traffic lane 341R of the right side by going under the traffic lane 341L of the left side.

FIG. 15A to FIG. 15F are schematic views illustrating other operations of the display apparatus according to the first embodiment.

Namely, FIG. 15A to FIG. 15F illustrate other display states of the display apparatus 20 according to the embodiment. The specific example is the case where the straight road 341, the branch road 342 extending in the left direction from the road 341, and a branch road 343 extending in the right direction from the road 341 exist at the travel direction change point 351. This example is the case where entrance to the branch road 343 from the road 341 is prohibited.

Figure 15A:
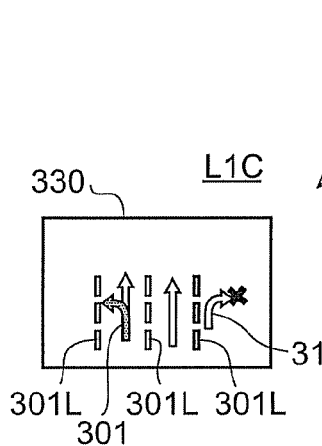
FIGS. 15A to 15F are schematic views illustrating another operation of the display apparatus according to the first embodiment.
Figure 15B:
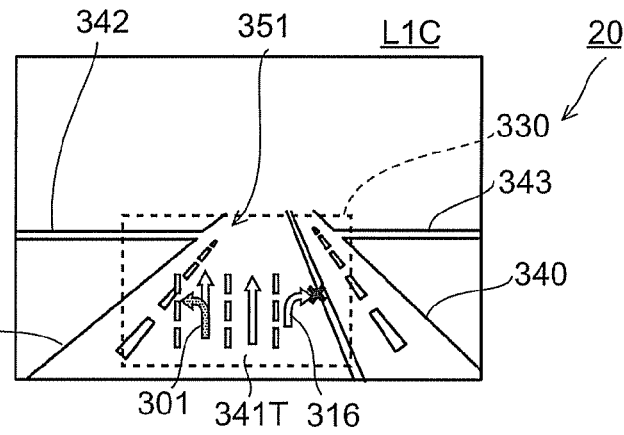

As shown in FIG. 15A and FIG. 15B, a sixth display object 316 that indicates that the branch road 343 is a no-entry road is displayed in addition to the first display object 301 in the case L1C where the distance between the travel direction change point 351 and the car 730 is long. In such a case, the sixth display object 316 is displayed in a two-dimensional pattern configuration.

Figure 15C:
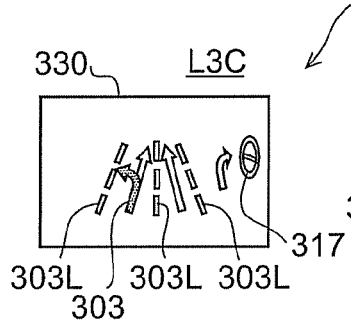
Figure 15D:
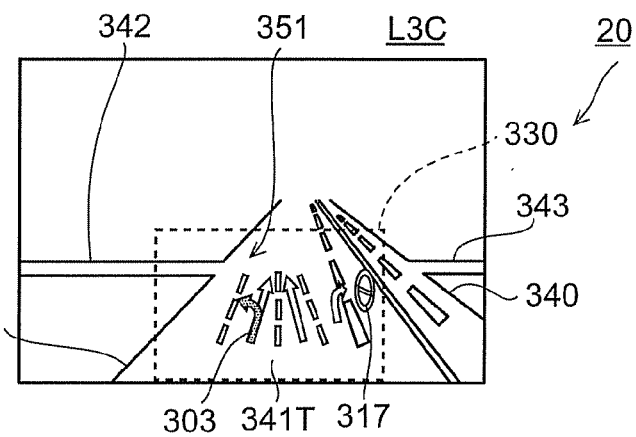

Then, as shown in FIG. 15C and FIG. 15D, a seventh display object 317 that indicates that the branch road 343 is a no-entry road is displayed in addition to the third display object 303 in the case L3C where the distance between the travel direction change point 351 and the car 730 is intermediate. In such a case, the seventh display object 317 is displayed in a three-dimensional configuration. In other words, the seventh display object 317 has a configuration corresponding to the state in which the "no entry" sign is mounted on the frontward right side as viewed from the front. Thereby, the branch road 343 can be more easily perceived as being a no-entry road.

Figure 15E:
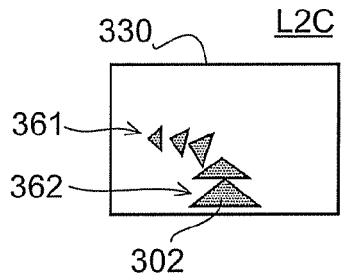
Figure 15F:
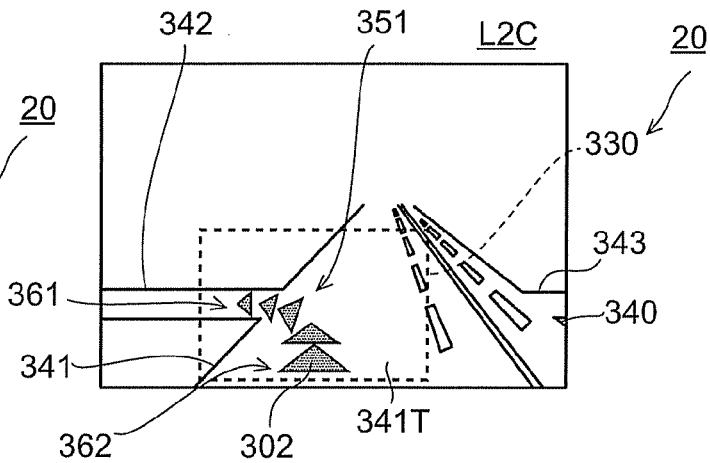

Then, as the travel direction change point 351 is approached as shown in FIG. 15E and FIG. 15F, the second display object 302 is displayed; and the travel direction of the car 730 is changed to the left side at the travel direction change point 351.

An example will now be described in which it is attempted to change the travel direction of the car 730 to the right side at the travel direction change point 351 in this case.

Figure 16A:
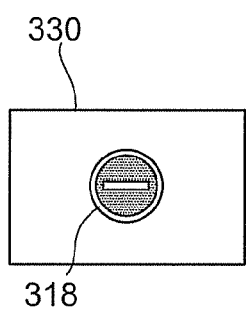
FIGS. 16A and 16B are schematic views illustrating another operation of the display apparatus according to the first embodiment.
Figure 16B:
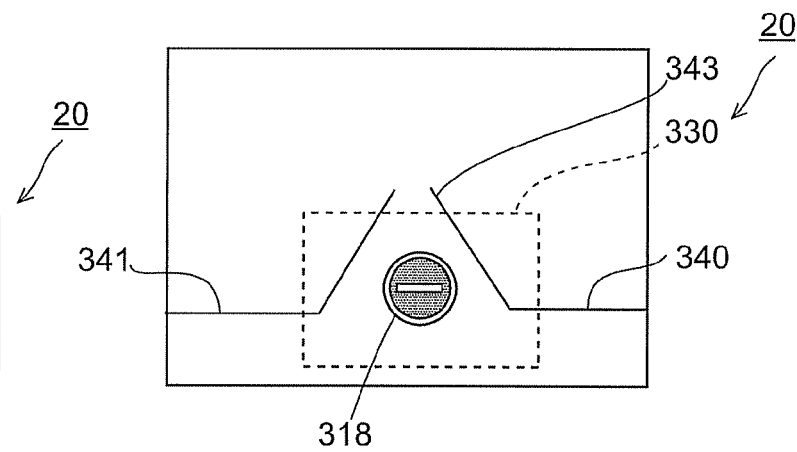

FIG. 16A and FIG. 16B are schematic views illustrating another operation of the display apparatus according to the first embodiment.

Namely, FIG. 16A and FIG. 16B illustrate another display state of the display apparatus 20 according to the embodiment. The specific example illustrates the display of the case where it is attempted to change the travel direction of the car 730 toward the no-entry branch road 343 of the right side at the travel direction change point 351.

In FIG. 16A and FIG. 16B, the front direction of the human 100 is a direction along the branch road 343 because the car 730 is attempting to enter the branch road 343. In such a case, an eighth display object 318 that has the configuration of a "no-entry" traffic sign as viewed from the front is displayed.

In the specific example, the image 330 is changed continuously and seamlessly from the state illustrated in FIG. 15C and FIG. 15D to the state illustrated in FIG. 16A and FIG. 16B.

Thereby, it can be more easily perceived that the branch road 343 that is being entered is a no-entry road.

The image 330 including the various content described with reference to FIG. 13A to FIG. 16B also can be applied to the displays of the display apparatuses 21, 22, and 23; and similar effects are obtained.

As described above, the display apparatuses according to the embodiment (the display apparatuses 10, 10a, 11, 20, 21, 22, and 23) project the light flux 112 including the image toward the one eye 101 of the human 100. Therefore, the difficulty of viewing due to the binocular parallax when viewing with both eyes is suppressed; the sense of depth perceived by the human 100 is increased; and it can be easy for the display content 180 to be perceived at the desired depthward position. Thus, in the case where the light flux 112 is projected toward the one eye 101 of the human 100, the divergence angle of the light flux 112 is appropriately controlled. An example of the configuration of the image projection unit 115 for appropriately controlling the divergence angle of the light flux 112 will now be described.

Figure 17:
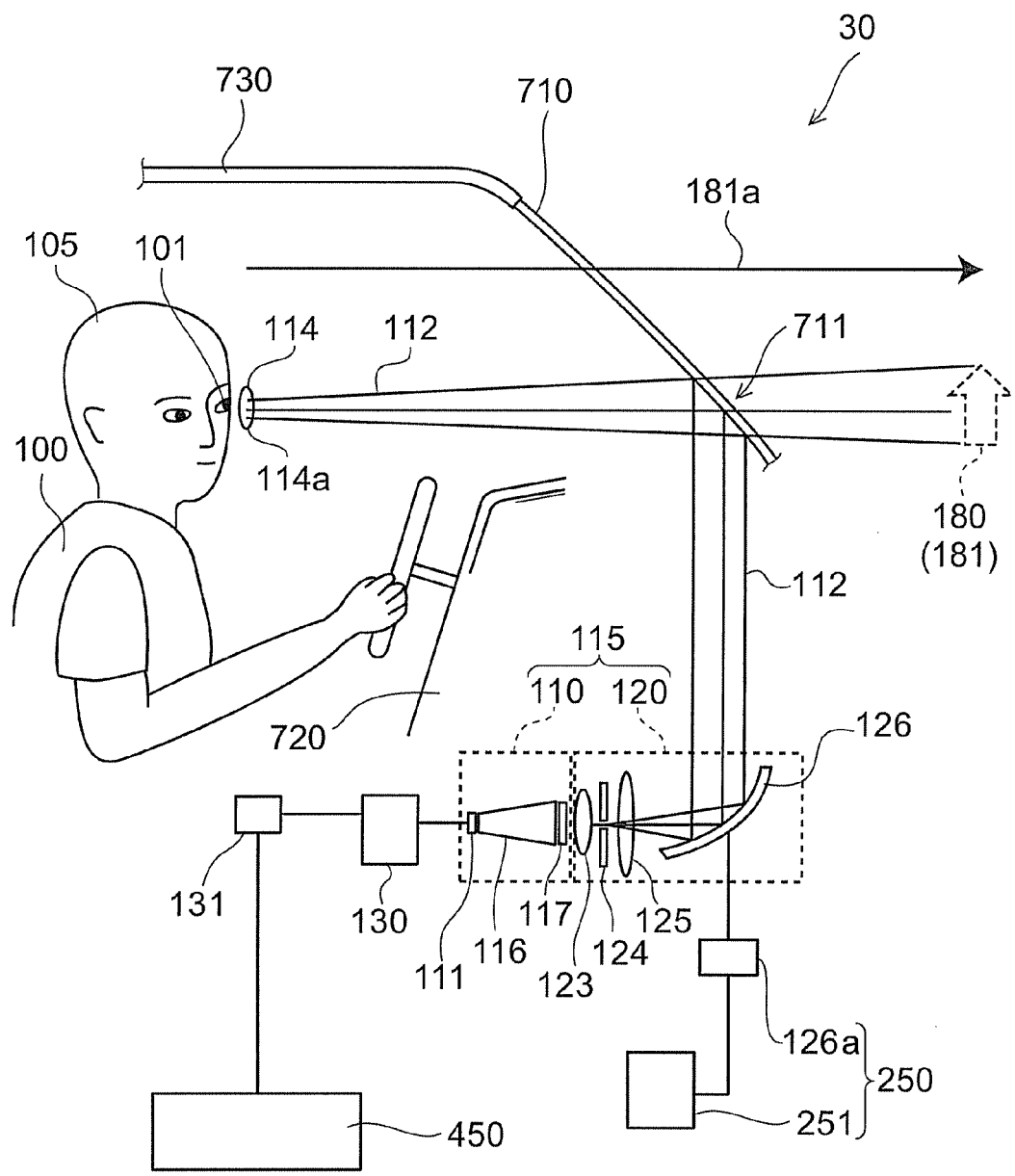
FIG. 17 is a schematic view illustrating the configuration of another display apparatus according to the first embodiment.

FIG. 17 is a schematic view illustrating the configuration of another display apparatus according to the first embodiment.

Namely, the display apparatus 30 illustrated in FIG. 17 is one specific example of the display apparatuses 10, 10a, 11, 20, 21, 22, and 23 recited above.

As shown in FIG. 17, the image projection unit 115 of the display apparatus 30 includes an image light formation unit 110 and a light flux projection unit 120.

The image light formation unit 110 includes, for example, a light source 111 and an image formation unit 117.

The light source 111 emits the light from which the light flux 112 is formed. The light source 111 may include various components such as LEDs (Light Emitting Diodes), high pressure mercury lamps, halogen lamps, lasers, etc. By using an LED as the light source 111, the power consumption can be reduced; and the apparatus can be lighter and smaller.

The image formation unit 117 may include, for example, an optical switch such as a liquid crystal display apparatus (LCD), etc. The image data from the image data generation unit 130 is supplied to the image formation unit 117; and the image formation unit 117 generates the light flux 112 including the image 330 based on the image data.

In the specific example, the image light formation unit 110 further includes a tapered light guide 116 provided between the light source 111 and the image formation unit 117. The light emitted from the light source 111 is controlled by the tapered light guide 116 to have a divergence angle within some range. By passing through the image formation unit 117, the light becomes the light flux 112 including the image 330, and the divergence angle of the light flux 112 is controlled to be within some range.

The light flux projection unit 120 projects the light flux 112 emitted from the image light formation unit 110 toward the human 100 by causing the light flux 112 to be reflected by the windshield unit 710 of the car 730. The light flux projection unit 120 may include, for example, various lenses, mirrors, and various optical elements that control the divergence angle (the diffusion angle).

In the specific example, the light flux projection unit 120 includes a light source side lens 123, an aperture 124, an emerging side lens 125, and an emerging-side mirror 126.

Along the travel direction of the light flux 112, the light source side lens 123 is disposed between the image light formation unit 110 and the emerging-side mirror 126; the aperture 124 is disposed between the light source side lens 123 and the emerging-side mirror 126; and the emerging side lens 125 is disposed between the aperture 124 and the emerging-side mirror 126. In the specific example, this aperture performs the divergence angle control toward the human viewer.

In the specific example, the emerging-side mirror 126 has a concave configuration. Thereby, the image 330 included in the light flux 112 can be enlarged and projected toward the human 100. The emerging-side mirror 126 may be movable; and the light flux 112 can be projected appropriately toward the eye 101 of the human 100 by, for example, manually or automatically adjusting the position and/or the angle of the emerging-side mirror 126 to match the position and/or the movement of the head 105 of the human 100.

By such a configuration, the divergence angle of the light flux 112 is controlled; and a projection region 114 of the light flux 112 is controlled to be within a constant range at the position of the human 100.

The spacing between the eyes (the pupils) of the human 100 is, for example, 60 millimeters (mm) to 75 mm. Therefore, the size (the width in the lateral direction) of the projection region 114 of the light flux 112 at the position of the human 100 may be set to be, for example, not more than about 60 mm to 75 mm in the case where the viewing is performed with the one eye 101. The size of the projection region 114 may be controlled mainly by the optical elements included in the light flux projection unit 120. The divergence angle control method included in the specific example is one example; and this is not limited thereto. It is sufficient for the projection region to be limited to a region viewed with one eye.

A projection position 114a of the light flux 112 at the position of the human 100 can be controlled by, for example, changing the placement position and/or the angle of the image projection unit 115. For example, the projection position 114a can be controlled by changing at least one selected from the placement position of the image light formation unit 110, the angle of the image light formation unit 110, the placement position of the light flux projection unit 120, and the angle of the light flux projection unit 120.

For example, the display apparatus 30 may further include a control unit 250 that controls the projection position 114a of the light flux 112 at the position of the human 100 by controlling the image projection unit 115. The projection position 114a may be controlled by the control unit 250 by, for example, controlling the angle of the emerging-side mirror 126.

For example, the control unit 250 includes a control signal unit 251 and a drive unit 126a. The control signal unit 251 outputs a control signal to the drive unit 126a to operate the drive unit 126a. The drive unit 126a includes a motor, etc., that changes, for example, the angle, the position, etc., of the emerging-side mirror 126. The drive unit 126a is operated by the control signal output from the control signal unit 251 to change the angle, the position, etc., of the emerging-side mirror 126 and change the projection position 114a of the light flux 112 at the position of the human 100. The drive unit 126a may be considered to be included in the image projection unit 115.

Various modifications of the configurations of the image light formation unit 110 and the light flux projection units 120 are possible. The dispositions of the components included in the image light formation unit 110 and the components included in the light flux projection unit 120 are arbitrary. For example, the image light formation unit 110 (and the components included in the image light formation unit 110) may be interposed between the components included in the light flux projection unit 120.

Various modifications to the image projection unit 115 are possible in addition to the specific examples recited above.

As illustrated in FIG. 17, the display apparatus 30 may further include a route generation unit 450 that determines the travel route (the route information) where the car 730 is conjectured to travel. The route generation unit 450 determines the travel route relating to the car 730 and transmits the route to the image data generation unit 130 via a route information connection unit 131.

The route generation unit 450 determines the travel route where the car 730 is conjectured to travel based on, for example, map information and the like and the current position of the car 730. At this time, for example, several route alternatives may be calculated; the human 100, i.e., the operator of the car 730, may be prompted for a selection; and the travel route may be determined based on the result. The route generation unit 450 may include a navigation system, etc.

The travel direction change point 351 where the travel direction of the car 730 is predicted to be changed is determined for the road 341 on which the car 730 is travelling based on the determined travel route and the current position of the car 730. Then, the travel direction of the car 730 at the travel direction change point 351 also is determined. The current position of the car 730 is determined by, for example, GPS, etc.

For example, the route generation unit 450 may be built into the image data generation unit 130. Also, the route generation unit 450 may be built into various components built into the display apparatus 30.

The route generation unit 450 may not be provided in the display apparatus 30. For example, a configuration may be employed in which a portion corresponding to the route generation unit 450 is provided in the navigation system provided separately inside the car 730; and the travel route where the car 730 is conjectured to travel that is generated by the navigation system may be acquired.

The portion corresponding to the route generation unit 450 may be provided separately from the car 730. In such a case, for example, the image data generation unit 130 may generate the image data by acquiring the data from the portion corresponding to the route generation unit 450 provided separately from the car 730 by wireless technology.

Thus, the route generation unit 450 (and the portion corresponding to the route generation unit 450) may be provided at any location.

Figure 18:
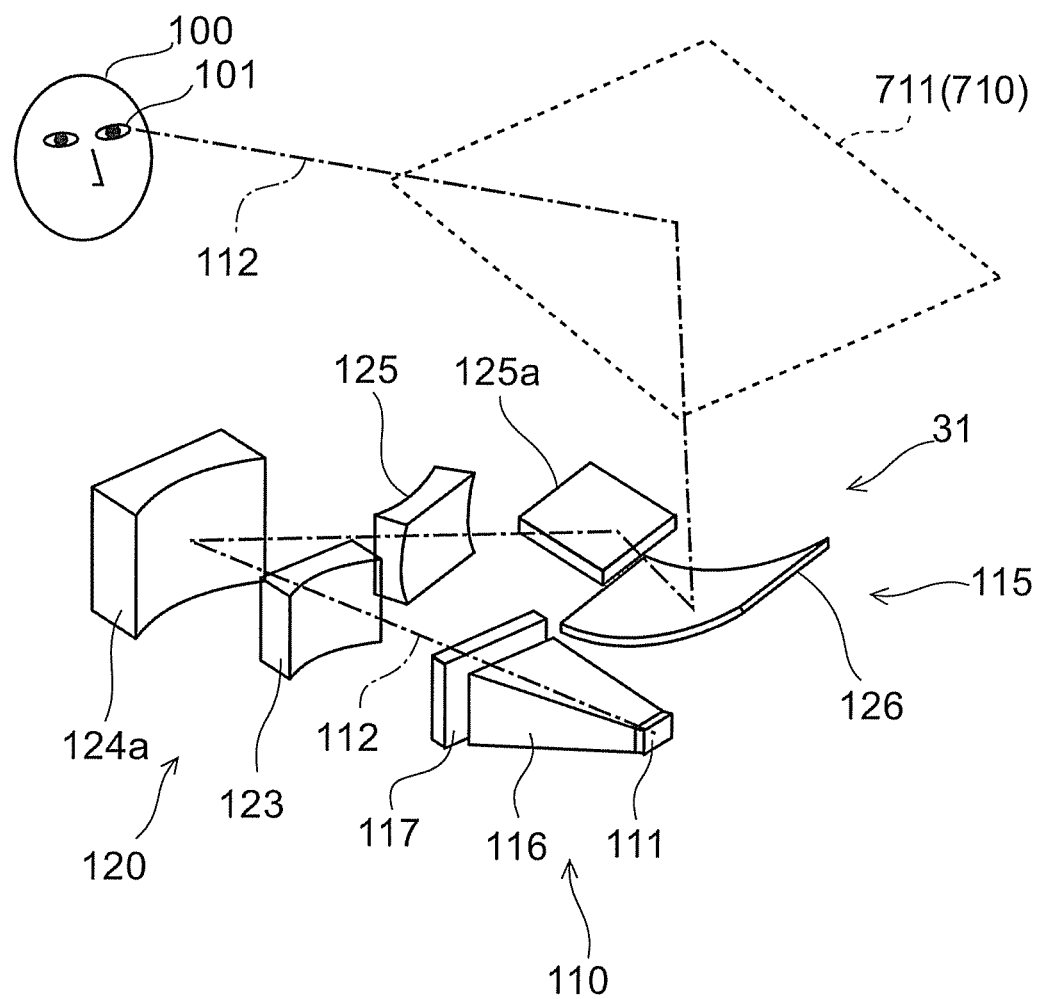
FIG. 18 is a schematic view illustrating the configuration of another display apparatus according to the first embodiment.

FIG. 18 is a schematic view illustrating the configuration of another display apparatus according to the first embodiment.

Namely, FIG. 18 illustrates the configuration of the display apparatus 31 according to the embodiment. FIG. 18 illustrates the configuration of the image projection unit 115. The configurations of the image data generation unit 130, the control unit 250, and the route generation unit 450 of the display apparatus 31 may be similar to those of the display apparatus 30; and the image data generation unit 130, the control unit 250, and the route generation unit 450 are not illustrated in FIG. 18.

Similarly, the image light formation unit 110 includes the light source 111, the tapered light guide 116, and the image formation unit 117 in the display apparatus 31 as shown in FIG. 18; and the configuration of the image light formation unit 110 is similar to that of the display apparatus 30.

On the other hand, the configuration of the light flux projection unit 120 of the display apparatus 31 is different from that of the display apparatus 30. Namely, the light flux projection unit 120 of the display apparatus 31 includes the light source side lens 123, a first mirror 124a, the emerging side lens 125, a second mirror 125a, and the emerging-side mirror 126.

Along the travel direction of the light flux 112, the light source side lens 123 is disposed between the image light formation unit 110 and the emerging-side mirror 126; and the first mirror 124a is disposed between the light source side lens 123 and the emerging-side mirror 126. The emerging side lens 125 is disposed between the first mirror 124a and the emerging-side mirror 126; and the second mirror 125a is disposed between the emerging side lens 125 and the emerging-side mirror 126.

Thus, the optical path of the light flux 112 of the display apparatus 31 is folded over. For example, a lens having a plano-concave configuration is used as the light source side lens 123. For example, a lens having a double-concave configuration is used as the emerging side lens 125. For example, a plane mirror is used as the second mirror 125a. For example, a concave mirror is used as the emerging side lens 125.

In the specific example, the emerging-side mirror 126 functions to change the emergence direction of the light flux 112 to the vertical direction. The second mirror 125a functions to change the emergence direction of the light flux 112 to the lateral direction.

By such a configuration, the divergence angle of the light flux 112 is controlled; and the projection region 114 of the light flux 112 at the position of the human 100 is controlled to be within a constant range.

Also, various modifications of the configuration of the image projection unit 115 are possible.

Other than an LCD, various optical switches such as a DMD (Digital Micromirror Device), a MEMS (Micro-electro-mechanical System), etc., may be used as the image formation unit 117 in the display apparatuses 10, 10a, 11, 20, 21, 22, 23, 30, and 31 according to the embodiment. The image light formation unit 110 may include a laser projector, an LED projector, etc. In such a case, the image is formed by a laser beam or light from an LED.

The car 730 (the vehicle) in which the display apparatus according to the embodiment is mounted may be not only a four-wheeler but also a two-wheeler. Also, the display apparatus according to the embodiment may be mounted in a railway car, a bus, etc. Further, the display apparatus according to the embodiment may be mounted in not only a wheeler but in any vehicle including an aircraft, a ship, etc.; and similar effects are obtained by performing similar operations.

The display apparatus according to the embodiment may be used also in various simulators that simulate cars, aircraft, etc. It is also possible to apply the display apparatus according to the embodiment to, for example, recreational display apparatuses such as games, etc.

Second Embodiment

The second embodiment is a display method. Namely, the second embodiment is a display method to project the light flux 112 including the image 330 toward the human 100 riding in a vehicle (e.g., the car 730) by using the windshield unit 710 of the vehicle (e.g., the car 730) to reflect the light flux 112.

Figure 19:
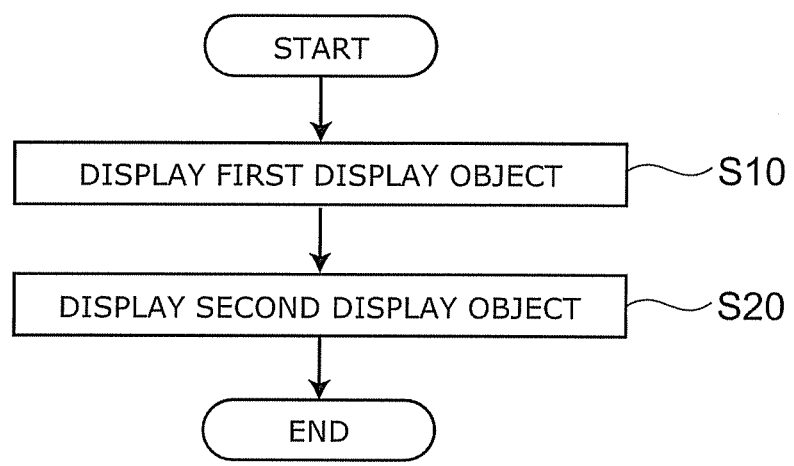
FIG. 19 is a flow chart showing a display method according to a second embodiment.

FIG. 19 is a flowchart illustrating the display method according to the second embodiment.

In the display method according to the embodiment as shown in FIG. 19, the first display object 301 that indicates the travel direction of the vehicle (the car 730) is displayed at the travel direction change point 351 when the distance from the vehicle (the car 730) to the travel direction change point 351 where the travel direction of the vehicle (the car 730) is predicted to be changed based on the travel route determined in relation to the vehicle (the car 730) is the first distance (step S10).

Then, the second display object 302 having a configuration different from that of the first display object 301 to indicate the travel direction of the vehicle (the car 730) at the travel direction change point 351 is displayed to correspond to the position of the travel direction change point 351 when the distance between the travel direction change point 351 and the vehicle (the car 730) is the second distance which is shorter than the first distance (step S20). Step S10 recited above may be implemented after step S20.

Thereby, a display method can be provided for easier decisions by the human operating the vehicle.

In this display method, the third display object 303 that has a configuration different from those of the first display object 301 and the second display object 302 to indicate the travel direction of the vehicle (the car 730) at the travel direction change point 351 may be further displayed when the distance between the travel direction change point 351 and the vehicle (the car 730) is the third distance which is between the first distance and the second distance recited above.

According to the display method according to the embodiment, a more continuous (more seamless) display is possible; and the decision by the human operating the vehicle can be easier.

Third Embodiment

According to a third embodiment, any of the display apparatuses according to the embodiments is mounted in a vehicle (the car 730).

In other words, for example, as shown in FIG. 2, the vehicle (the car 730) according to the embodiment includes the display apparatus 10 according to the embodiment and the windshield unit 710 configured to reflect the light flux 112 emitted from the display apparatus 10 toward the human 100. The reflecting unit 711 (e.g., a combiner) may be additionally provided on the windshield unit 710; or the windshield unit 710 may include the reflecting unit 711. The display apparatus applied in the vehicle may include any of the display apparatuses (the display apparatuses 10, 10a, 11, 20, 21, 22, 23, 30, and 31) according to the embodiment and a display apparatus of a modification of these display apparatuses.

According to the embodiment, a vehicle can be provided for easier decisions by the human operating the vehicle.

Hereinabove, exemplary embodiments of the invention are described with reference to specific examples. However, the invention is not limited to these specific examples. For example, one skilled in the art may similarly practice the invention by appropriately selecting specific configurations of components included in display apparatuses and moving bodies (cars) from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display apparatuses, display methods, and moving bodies practicable by an appropriate design modification by one skilled in the art based on the display apparatuses, the display methods, and the moving bodies described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from, the spirit of the inventions. The accompanying claims and their equivalents are intended to cover such forms or modifications as would fall within the scope and spirit of the invention.

What is claimed is:

1. A display apparatus, comprising:

an image data generation unit configured to generate image data; and an image projection unit configured to project a light flux including an image toward a human riding in a vehicle by using a windshield unit of the vehicle to reflect the light flux, the image being based on the image data generated by the image data generation unit, the image data generation unit being configured to:

generate the image data relating to the image including a first display object displayed at a first position when a distance from a travel direction change point to the vehicle is a first distance, the travel direction change point being where a travel direction of the vehicle is predicted to be changed based on a travel route determined in relation to the vehicle the first display object being configured to indicate the travel direction of the vehicle at the travel direction change point, the first display object having a first shape and a first color; and generate the image data relating to the image including a second display object displayed at second a position when the distance from the travel direction change point to the vehicle is a second distance shorter than the first distance, the second display object being configured to indicate the travel direction of the vehicle at the travel direction change point, the second display object having at least one of a second shape different from the first shape and a second color different from the first color, the second position being corresponding to the travel direction change point.

2. The apparatus according to claim 1, wherein the image projection unit is configured to project the light flux including the image including the second display object toward only one eye of the human.

3. The apparatus according to claim 1, wherein a size of the second display object on a first intra-image position side inside the image corresponding to the travel direction change point is smaller than a size of the second display object on a second intra-image position side inside the image corresponding to a point more proximal to the vehicle than is the travel direction change point.

4. The apparatus according to claim 1, wherein the at least one of the second shape and the second color changes temporally.

5. The apparatus according to claim 1, wherein the first distance is more than 40 meters.

6. The apparatus according to claim 5, wherein the second distance is not more than 40 meters.

7. The apparatus according to claim 1, wherein the first display object has a pattern configuration used as a traffic sign.

8. The apparatus according to claim 7, wherein the second display object includes a plurality of triangular patterns and an axis of each of the plurality of triangular patterns aligns along the travel direction of the vehicle at the travel direction change point.

9. The apparatus according to claim 1, wherein a size of a portion of the second display object positioned in a lower side in the image is larger than a size of a portion of the second display object positioned in an upper side in the image.

10. The apparatus according to claim 9, wherein a size of a portion of the first display object positioned in the lower side in the image is same as a size of a portion of the first display object positioned in the upper side in the image.

11. The apparatus according to claim 1, wherein the second display object is configured to provide the human a sense of perspective and the first display object is configured not to provide the human the sense of perspective.

12. The apparatus according to claim 1, wherein the image data generation unit is configured to generate the image data relating to the image further including a first pattern to indicate a traffic lane when the distance between the travel direction change point and the vehicle is the first distance.

13. The apparatus according to claim 12, wherein the first pattern has a band configuration extending in a vertical direction in the image.

14. The apparatus according to claim 1, wherein the image data generation unit further generates the image data relating to the image including a third display object when the distance between the travel direction change point and the vehicle is a third distance between the first distance and the second distance, the third display object being configured to indicate the travel direction of the vehicle at the travel direction change point, the third display object having at least one of a third shape and a third color, the third shape being different form the first shape and different from the second shape, the third color being different form the first color and different from the second color.

15. The apparatus according to claim 14, wherein a size of the third display object on a first intra-image position side inside the image corresponding to the travel direction change point is smaller than a size of the third display object on a second intra-image position side inside the image corresponding to a point more proximal to the vehicle than is the travel direction change point.

16. The apparatus according to claim 14, wherein the at least one of the third shape and the third color changes temporally.

17. The apparatus according to claim 14, wherein the image data generation unit is configured to generate the image data relating to the image further including a second pattern to indicate a traffic lane when the distance between the travel direction change point and the vehicle is the third distance, the second pattern includes a plurality of band configurations, a distance between the band configurations in an upper side portion in the image is smaller than a distance between the band configurations in lower side portion in the image.

18. The apparatus according to claim 1, wherein the second position is superimposed onto the travel direction change point.

19. The apparatus according to claim 18, wherein the first position is not superimposed onto the travel direction change point.

20. The apparatus according to claim 1, wherein the second position is positioned lower than the first position.

21. A display method including projecting a light flux including an image toward a human riding in a vehicle by using a windshield unit of the vehicle to reflect the light flux, the method comprising:
displaying a first display object at a first position when a distance from a travel direction change point to the vehicle is a first distance, the travel direction change point being where a travel direction of the vehicle is predicted to be changed based on a travel route determined in relation to the vehicle, the first display object being configured to indicate the travel direction of the vehicle at the travel direction change point, the first display object having a first shape and a first color; and
displaying a second display object at a second position when the distance from the travel direction change point to the vehicle is a second distance shorter than the first distance, the second display object being configured to indicate the travel direction of the vehicle at the travel direction change point, the second display object having at least one of a second shape different from the first shape and a second color different form the first color, the second position being corresponding to the travel direction change point.

22. The method according to claim 21, further displaying a third display object when the distance between the travel direction change point and the vehicle is a third distance between the first distance and the second distance, the third display object being configured to indicate the travel direction of the vehicle at the travel direction change point, the third display object having at least one of a third shape and a third color, the third shape being different form the first shape and different from the second shape, the third color being different form the first color and different from the second color.

23. The method according to claim 21, wherein the second position is superimposed onto the travel direction change point.

24. The method according to claim 23, wherein the first position is not superimposed onto the travel direction change point.

25. The method according to claim 21, wherein the second position is positioned lower than the first position.

26. A vehicle, comprising:
a display apparatus including:
- an image data generation unit configured to generate image data; and
- an image projection unit configured to project a light flux including an image toward a human riding in a vehicle by using a windshield unit of the vehicle to reflect the light flux, the image being based on the image data generated by the image data generation unit,
- the image data generation unit being configured to:
  - generate the image data relating to the image including a first display object displayed at a first position when a distance from a travel direction change point to the vehicle is a first distance, the travel direction change point being where a travel direction of the vehicle is predicted to be changed based on a travel route determined in relation to the vehicle, the first display object being configured to indicate the travel direction of the vehicle at the travel direction change point; and
  - generate the image data relating to the image including a second display object displayed at a second position when the distance from the travel direction change point to the vehicle is a second distance shorter than the first distance, the second display object being configured to indicate the travel direction of the vehicle at the travel direction change point, the second display object having at least one of a second shape different from the first shape and a second color different form the first color, the second position being corresponding to the travel direction change point; and
- a windshield unit configured to reflect the light flux emitted from the display apparatus toward the human.

27. The vehicle according to claim 26, wherein the second position is superimposed onto the travel direction change point.

28. The vehicle according to claim 27, wherein the first position is not superimposed onto the travel direction change point.

29. The vehicle according to claim 26, wherein the second position is positioned lower than the first position.

* * * * *